United States Patent
Chiu et al.

(10) Patent No.: US 10,333,998 B1
(45) Date of Patent: *Jun. 25, 2019

(54) MANAGING CONNECTION REQUESTS FOR MULTIPLE DEVICES

(71) Applicant: Amazon Technologies, Inc., Reno, NV (US)

(72) Inventors: King Chiu, Seattle, WA (US);
Venkatesh Kancharla, Chennai (IN);
Saibaba Telukunta, Bellevue, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 244 days.

This patent is subject to a terminal disclaimer.

(21) Appl. No.: 15/390,884

(22) Filed: Dec. 27, 2016

(51) Int. Cl.
*G06F 15/16* (2006.01)
*H04L 29/06* (2006.01)
*G10L 15/18* (2013.01)
*G10L 15/26* (2006.01)

(52) U.S. Cl.
CPC ...... *H04L 65/1069* (2013.01); *G10L 15/1822* (2013.01); *G10L 15/265* (2013.01); *H04L 65/105* (2013.01); *H04L 65/1006* (2013.01); *H04L 65/1073* (2013.01)

(58) Field of Classification Search
CPC ............ H04L 65/1069; H04L 65/1006; H04L 65/105; H04L 65/1073; G10L 15/1822; G10L 15/265
See application file for complete search history.

(56) References Cited

U.S. PATENT DOCUMENTS

| | | | |
|---|---|---|---|
| 10,057,421 B1* | 8/2018 | Chiu | H04M 3/4936 |
| 2005/0009541 A1* | 1/2005 | Ye | G06Q 10/107 |
| | | | 455/466 |
| 2007/0121856 A1* | 5/2007 | Alperin | H04M 3/42263 |
| | | | 379/142.12 |
| 2010/0158231 A1 | 6/2010 | Newberg et al. | |
| 2014/0029739 A1* | 1/2014 | Hariri | G06Q 30/018 |
| | | | 379/201.01 |
| 2014/0187218 A1 | 7/2014 | Carrelli et al. | |
| 2015/0207924 A1* | 7/2015 | Kim | H04M 1/72583 |
| | | | 455/414.1 |
| 2016/0065734 A1 | 3/2016 | Bin et al. | |
| 2017/0171384 A1* | 6/2017 | Ghuli | H04M 3/42059 |

OTHER PUBLICATIONS

Non-Final Office Action issued in corresponding U.S. Appl. No. 15/390,890 dated Sep. 14, 2017.
Notice of Allowance issued in corresponding U.S. Appl. No. 15/390,890 dated May 4, 2018.

* cited by examiner

*Primary Examiner* — Mohamed A. Wasel
(74) *Attorney, Agent, or Firm* — Hogan Lovells US, LLP

(57) ABSTRACT

Communications-capable devices and agents can each register with a single address of record (AOR), or other such identifier. Various AORs or virtual AORs (VAORs) can then be mapped together whereby a device can be associated with multiple groupings, such as for households where devices may be shared amongst two or more users. The ability to maintain mappings between the AORs/VAORs enables the devices to be associated with multiple groupings while only registering with a single AOR, and simplifies the call routing logic as call connection requests only need to specify a single AOR/VAOR to reach a particular user or grouping of users via the corresponding registered devices.

20 Claims, 12 Drawing Sheets

MANAGING CONNECTION REQUESTS FOR MULTIPLE DEVICES

BACKGROUND

As electronic devices become increasingly sophisticated, people are using such devices in new and interesting ways. Some of these devices have adopted voice control where the device can perform various actions in response to a spoken question or instruction. For example, a user might issue an instruction to communicate with a specified recipient. A system receiving information for the instruction can attempt to determine the recipient for the request and cause a connection to be established from the receiving device to a device associated with the recipient. It might be the case, however, that the recipient is associated with multiple devices, and one or more of these devices might be shared with another user. Conventional approaches to maintaining the correct addresses and records for these situations are very resource intensive and can require the knowledge of various different addresses to which a particular device might be registered.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Systems and methods in accordance with various embodiments of the present disclosure may overcome one or more of the aforementioned and other deficiencies experienced in conventional approaches to managing communications in a networked environment. In particular, various approaches enable communications-capable devices and agents to each register with a single address of record (AOR), or other such identifier. Various AORs or virtual AORs (VAORs) can then be mapped together such that a device can be associated with different groupings, such as for households shared amongst two or more users. The ability to maintain mappings between the AORs/VAORs enables the devices to be associated with multiple groupings while only registering with a single AOR, and simplifies the call routing logic as call connection requests only need to specify a single AOR/VAOR to reach a particular user or grouping of users via the corresponding registered devices.

Various other functions can be implemented within the various embodiments as well as discussed and suggested elsewhere herein.

Figure 1:
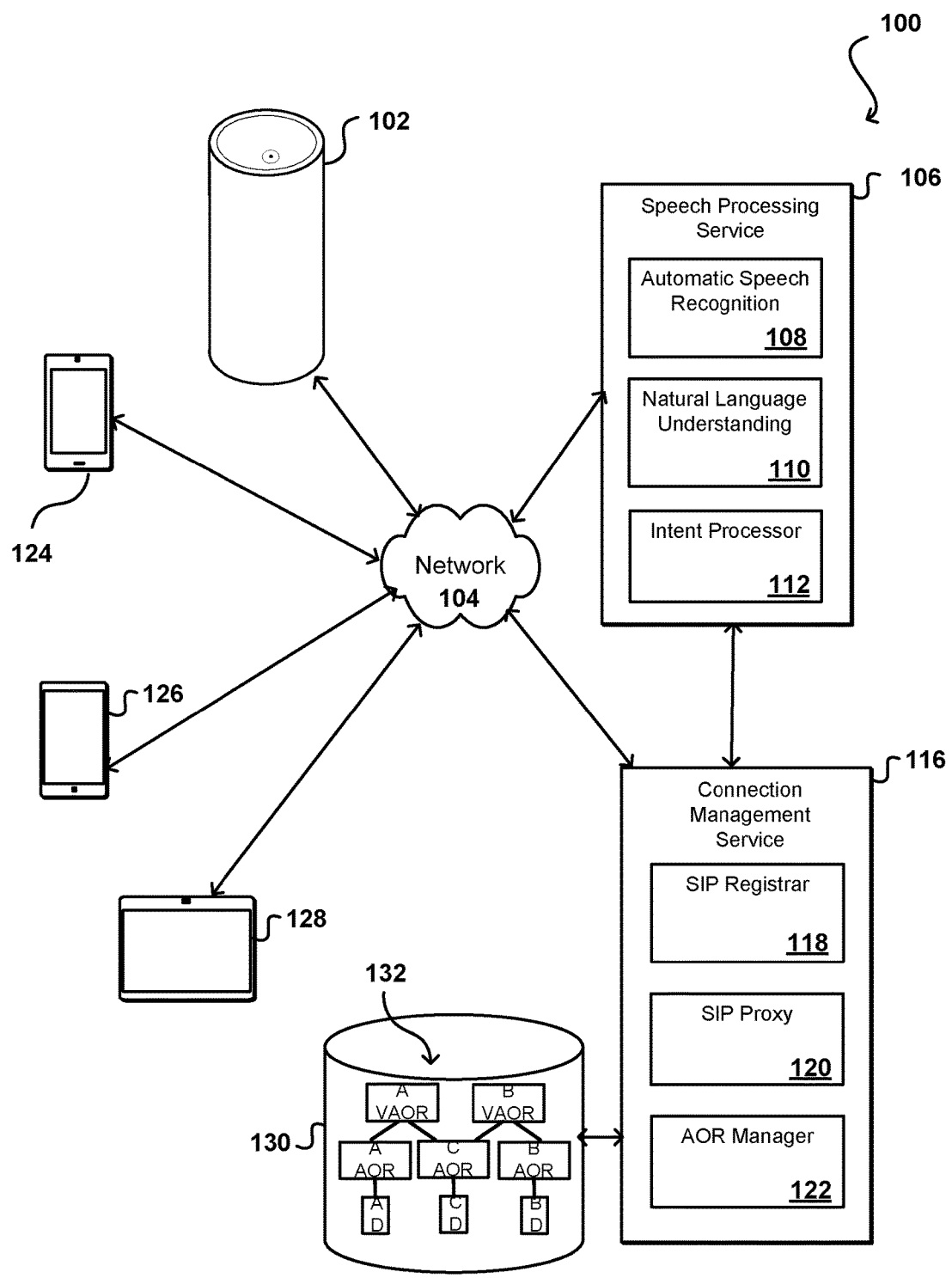
FIG. 1 illustrates an example system for connecting calls between electronic devices that can be utilized in accordance with various embodiments.

FIG. 1 illustrates an example system 100 that can be utilized to route calls, or other connections or communications, between various electronic devices. Although a voice communications device 102 (e.g., an Amazon Echo) is shown communicating with portable devices 124, 126, 128 such as smart phones or tablet computers, it should be understood that various other types of electronic devices or user communication devices that are capable of receiving and processing communications, such as voice communications, can be used in accordance with various embodiments discussed herein. These devices can include, for example, notebook computers, ultrabooks, personal data assistants, video gaming consoles, televisions, set top boxes, smart televisions, portable media players, unmanned devices (e.g., drones or autonomous vehicles), wearable computers (e.g., smart watches, smart glasses, bracelets, etc.), display screens, display-less devices, virtual reality headsets, display-based devices, smart furniture, smart household devices, smart vehicles, smart transportation devices, and/or smart accessories, among others.

A microphone or other signal capture component can capture an audio signal, such as a voice command, and perform at least some basic processing of the audio signal. For example, an application (e.g., a media service) executing on the voice communications device, or otherwise in communication with the voice communications device, can analyze the audio signal corresponding to a user's speech (also referred to as an utterance) that includes audio input data 106 to perform at least one function. The functions can include, for example, placing a call, answering questions, playing music, reading audiobooks, controlling connected devices via voice commands/instructions, or sending an electronic message (e.g., a text message or a voice message) among other such functions The voice communications device can be associated with a customer account provided by a service provider. The service provide can provide resources through a resource provider environment, which in this example can include a speech processing service 106 and/or a connection management service 116. The customer account can include one or more profiles, e.g., one or more family member profiles or other profiles, where each profile can be associated with preferences, access rights, and other information, and may share certain account settings as may include payment information (same credit card), address, media content access types, etc. In the situation where one of the members desires to have an action performed, the member can activate the voice communications device, for example, using a wakeword (e.g., "Alexa"), and then speak the request or command. In some embodiments the member can announce who they are to cause the device to load the appropriate member profile and corresponding preferences, access rights, and other such information. In various embodiments, rather than have a member announce who they are, the voice communications device can automatically determine the member speaking using speech analysis software, logged in accounts, and the like. For example, an application executing on the voice communications device or otherwise in communication with the device can analyze the speaker's voice to determine an identity of the speaker and associated profile. Based on the identity of the speaker, the appropriate member profile and corresponding preferences, access rights, and contracts authority can be used. It should be noted that other approaches can be implemented to login to a particular profile. For example, each profile may be logged into by, for example, saying the wakeword then a special keyword/phrase (e.g., sign in as Jane) and/or by biometrics (i.e., speaker identification based on sound of voice and, if camera is available, facial recognition or, if fingerprint scanner, fingerprint ID), among other such approaches.

In this example, the customer account can be associated with a user profile associated with the speaking user, where the user has associated at least one contact with their user account. The contact can include any appropriate information, such as may include contact name, email address, IP address, contact identifier, account number, phone number, and the like. There may be other account or profile data associated with the voice communications device, separate from or in addition to a specific user, that can be used to identify a target address or recipient identity based upon information such as a recipient name or identifier (e.g., Mom or "my boss"). In response to the user speaking the phrase "Wakeword, call Alice," audio input data that includes the phrase is received at the voice communications device 102 and an application executing on the voice communications device or otherwise in communication with the voice communications device can analyze the audio input data. For example, the contents of the audio input data can be streamed to a speech processing service 106 that can analyze the portions of the audio data upon receipt. In some embodiments, the backend server can begin processing one or more portions of the audio input data prior to the user having completed making the instructions. Thus, the speech processing service 106 can start analyzing whatever portion of the audio input data it received through a variety of techniques such as automatic speech recognition (ASR) and natural language understanding (NLU) to convert the audio input data into a series of identifiable words, or tokens, and then to analyze those words in order to interpret the meaning of the request from the user. The speech processing service 106 can utilize ASR techniques to recognize the spoken words that were recorded and stored in the audio data and to translate them into known text that can then be analyzed by NLU techniques to attempt to decipher the meaning of the request from the user. Any suitable computer implemented speech-to-text technique may be used to convert the received audio signal(s) into text. In some embodiments, one or more filters may be applied to the received audio input data to reduce or minimize extraneous noise, however this is not required. In this example, analyzing the audio input data can include determining contact information "Alice" and an instruction "call." The speech processing service determine information from the user's contacts to identify information for Alice, and can then forward or send a request to a connection management service 116 to obtain the appropriate call connection information.

The example connection management service 116 utilizes the session initialization protocol (SIP) for managing communications and connections that are based at least in part upon Internet or other network-based technologies. SIP can be used to manage multimedia communication sessions, such as for voice or video calls hosted over Internet Protocol (IP)-based networks. The protocol defines messages or communications that are sent between endpoints, such as may correspond to the voice communications device 102 and an end user device 124, 126, 128. SIP is an application layer protocol that can manage streams or connections for various concurrent sessions independent of the underlying transport layer. For video and voice calls, SIP can utilize transmission protocols such as the secure real-time transport protocol (SRTP) or the real-time transport protocol (RTP). SIP can typically be carried by transport layer protocols including the user datagram protocol (UDP) or the transmission control protocol (TCP). SIP is transaction based, such that actions are taken through a request and response model. Each resource of the connection management service 116 can be identified by a uniform resource identifier (URI), which typically has a form such as sip: username@domainorhostport. SIP clients, such as may be installed on the various devices 102, 124, etc., would typically utilize UDP or TCP on ports 5060 or 5061 to connect to SIP servers and endpoints.

As illustrated, the SIP-based connection management service 116 can include various components, as may include a SIP registrar 118, a SIP proxy 120, and an AOR manager 122. The SIP registrar 118 can function as a SIP endpoint that accepts requests to register various SIP devices. The registrar 118 can record the address and other parameters for a SIP user agent executing on the voice communications device 102 or other client devices. The registrar can use this information to provide location services for subsequent SIP requests. The connection management service 116 also includes a SIP proxy 120, which is often located proximate the SIP registrar. The proxy 120 can function as both client and server for the purpose of making SIP requests on behalf of client devices. The proxy 120 can also function as a router in at least some embodiments, and can be used to enforce rules or policies on the established (or requested) connections. The SIP proxy 120 can modify portions of a request message as needed before routing the message. The connection management service 116 can include various other components as well, such as a redirect server for directing to alternate URIs or external domains, border controllers for providing various network topologies, gateways for interconnecting networks, and the like.

In this example, the connection management service 116 utilizes the AOR manager 122 to manage the addresses of record for various devices. As mentioned, an AOR is an address of record to which an endpoint for a device is registered. As discussed in more detail later herein, the AOR manager 122 can generate and maintain mappings 132 between device endpoints and AORs, as well as between AORs and virtual AORs (VAORs), and endpoints and VOARs, among other such options. These mappings, as well as identifying information for the endpoints, AORs, and VAORs, can be stored to one or more repositories 130 accessible to the connection management service 116. When a call request is received, such as from the voice communications device 102, the AOR manager 122 can be contacted to determine the appropriate AOR or VAOR to utilize for the call. A specified recipient might be associated with one or more AORs and/or VAORs. The mappings 132 can be analyzed to determine related AORs or VAORs, such as related AORs for communal devices that are shared by the recipient. If the request specified a household VAOR, the mappings might indicate that there are several related AORs. The mappings can be analyzed until each related device associated with a mapped AOR is determined, as such an approach enables each device to be registered to only a single AOR while being accessible via the mappings to other AORs or VAORS. The mappings and record information can be consulted to determine the appropriate AOR or VAOR to be used for the call connection. Once determined, the connection management service 116 can send the AOR/VAOR information back to the speech processing service 106, which can pass the information along to the voice communication device 102. The voice connection device 102 can then send a call connection request to the connection management service including the AOR/VAOR information. The AOR/VAOR data can be resolved by the AOR manager 122 of the connection management service 116 to determine the appropriate mappings 132, etc., as well as the endpoints for devices associated with those mappings. The call connection request can then be forwarded to the client devices 124, 126, 128 corresponding to the determined endpoints. Once one of the devices accepts the request, the connection can be established with the voice communication device 102, and the connected devices can communicate via the connection as peer devices. The connection can be maintained through, or separate from, the connection management service 116.

Figure 2:
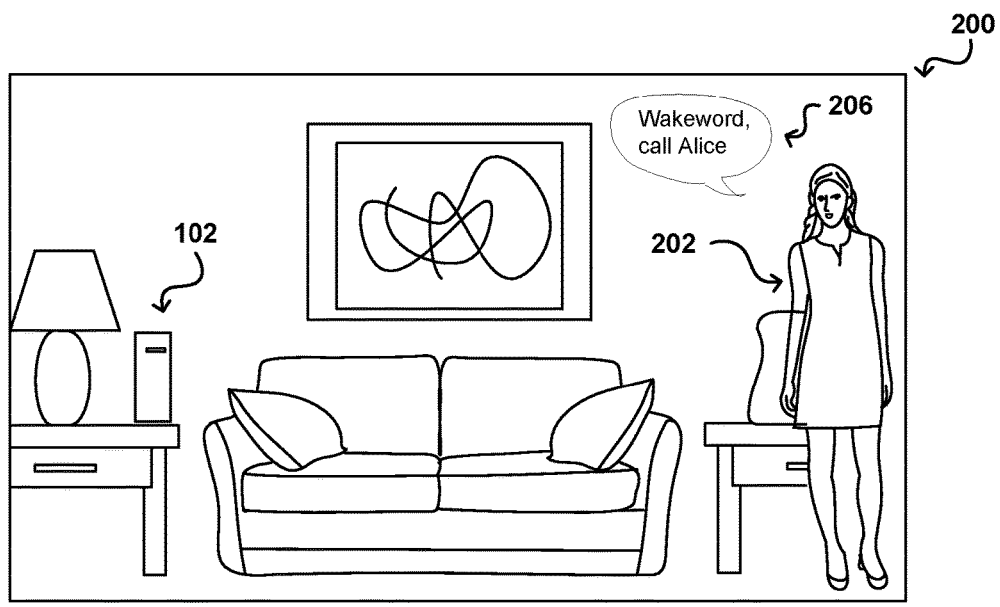
FIG. 2 illustrates an example environment in which a voice command might be received regarding a call request in accordance with various embodiments.

FIG. 2 illustrates an example environment 200 in which a voice command 206 can be received to a voice communications device in accordance with various embodiments. In this example, a user 202 will generate an utterance, or otherwise speak a voice command 206 that can be received by a voice communications device 102. The voice-enabled communications device 102 can include, for example, any device having a microphone or other component configured to generate audio data from received sound in the frequency range in which humans communicate. As will be described further herein, voice communications devices include devices that utilize a wakeword or other predetermined sound profile to activate some functionality (e.g., send data to a remote device, such as audio input data for speech analysis) as well as button-activated devices that utilize a button (graphical, physical, or both) to enable some audio-related functionality (e.g., a sound-capturing and sending mode). In this example, the user 202 can speak a request within an environment where the voice communications device 102 is located. The request may be any question, inquiry, instruction, phrase, or other set of one or more words/sounds. For example, the user may say, "Wakeword, call Alice." In this example, the word "Wakeword" has a special connotation, in that it may be referred to as a wakeword, or activation word (the wakeword would be a different word, or a particular phoneme or a particular sound, such as the sound made by clapping or snapping your fingers). In particular, a wakeword may be detected within audio input data detected by one or more microphones located on the voice communications device. Persons of ordinary skill in the art will recognize, however, that the one or more microphones may alternatively be located on a separate device in communication with the voice communications device. In some embodiments, after the wakeword is detected, the voice communications device 102 may begin interpreting/analyzing audio input data until no more speech is detected. In general, the voice communications device 102 constantly listens for the wakeword and is otherwise inactive. Once the wakeword is recognized, the voice communications device switches from a passive mode to an active mode. It should be noted that the wakeword does not have to be the first word or sound in a given sentence or request. The voice communications device 102 can be configured such that the device can record and store a limited amount of audio input data that should, in most instances, equal the amount of time needed to speak a sentence or more. Accordingly, even if a wakeword is recognized in the middle or end of a sentence, the voice communications device will have retained the entire sentence which can then be analyzed by backend servers to determine what is being requested. In this example, the voice communications device 102 will detect the wakeword in the utterance 206 and cause an amount of audio data to be recorded, that can then be analyzed on the device or, in at least some embodiments, uploaded to a speech processing service for analysis.

Figure 3:
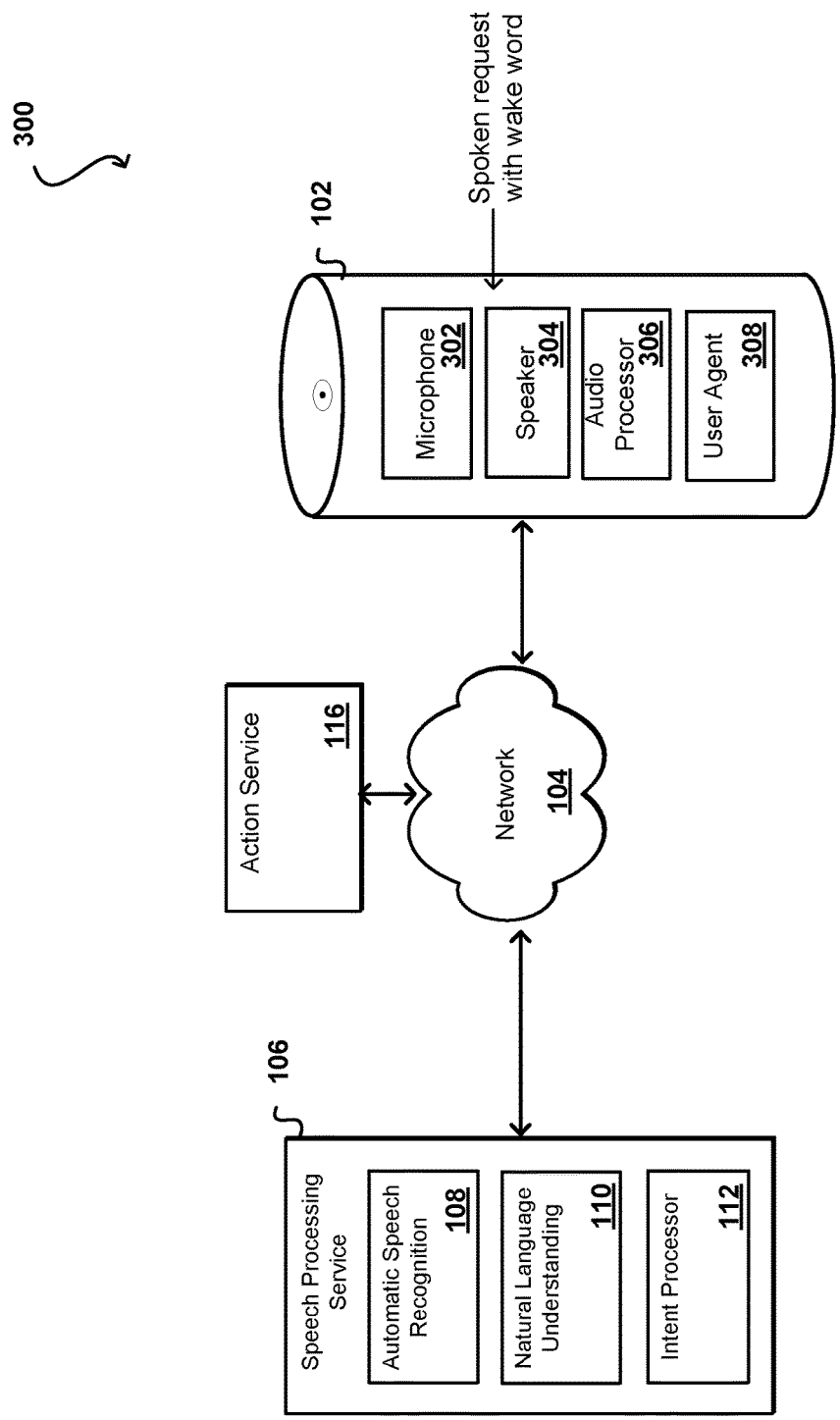
FIG. 3 illustrates an example system for processing a voice command or spoken request that can be utilized in accordance with various embodiments.

FIG. 3 illustrates a system 300 including a speech processing service 106 that can be utilized in accordance with various embodiments. The speech processing service 106 can be implemented using various hardware and software components, such as is described in more detail with respect to FIG. 10. In this example, the system shows example data flows between a speech processing service 106, an action service 116, and a voice communications device 102 across at least one network 104. It should be noted that additional services, providers, and/or components can be included in such a system, and although some of the services, providers, components, etc. are illustrated as being separate entities and/or components, the illustrated arrangement is provided as an example arrangement and other arrangements as known to one skilled in the art are contemplated by the embodiments described herein. In this example, a user may make an utterance, such as an utterance that includes a spoken command or request for the speech processing service 106 to perform some task, such as to execute a call connection request. The user may speak the utterance into (or in the presence of) the voice communications device. The voice communications device 102 can correspond to a wide variety of electronic devices. In some embodiments, the voice communications device may be a computing device that includes one or more processors (such as may include at least one audio processor 306) and a memory which may contain software applications executed by the processors. The voice communications device may include, or be in communication, with an audio input component for accepting speech input on which to perform speech recognition, such as a microphone 104. The voice communications device may also include, or be in communication, with an output component for presenting responses or other information from the speech processing service 106, such as a speaker 304. The software of the voice communications device may include hardware components and/or software for establishing communications over wireless communication networks or directly with other computing devices. In some embodiments the voice communications device 102 can also include a SIP user agent 308 that enables the device to function as an endpoint for SIP-based communications as discussed elsewhere herein.

The action service 210 can correspond to an online or electronic service that is able to receive requests to perform specific actions. As mentioned elsewhere herein, these actions can include tasks such as to establish communications, stream media, execute search queries, and the like. In many examples discussed herein, the action service 210 would correspond to a SIP-based communication management service, or other such system or offering, although various other options could be implemented as well within the scope of the various embodiments.

The speech processing service 106 can receive a user utterance via the at least one network 104. The speech processing service 106 can be a network-accessible service in communication with the voice communications device 102 via the network, such as a cellular telephone network or the Internet as discussed elsewhere herein. A user may use the voice communications device 102 to submit utterances, receive information, and initiate various processes, either on the voice communications device 102 or at the speech processing service 106. For example, as described, the user can issue spoken commands to the voice communications device 102 in order to establish, alter, or otherwise manage a communications connection or call.

The speech processing service 106 may include an automatic speech recognition (ASR) module 108 that performs automatic speech recognition on audio data regarding user utterances, a natural language understanding (NLU) module 110 that performs natural language understanding on transcriptions generated by the ASR module 108, and an intent processor 112 that applies contextual rules to current NLU results based on prior interpretations and dialog acts, for example, in order to determine the intent and communicate with the connection management service to obtain the appropriate AOR and other such information for the call.

The speech processing service 106 may include any number of server computing devices, desktop computing devices, mainframe computers, and the like. Each individual device may implement one of the modules or components of the speech processing service 106. In some embodiments, the speech processing service 106 can include several devices physically or logically grouped together to implement one of the modules or components of the speech processing service 106. For example, the speech processing service 106 can include various modules and components combined on a single device, multiple instances of a single module or component, etc. In one specific, non-limiting embodiment, the speech processing service 106 may include a server or group of servers configured with ASR and/or NLU modules 108, 110, a server or group of servers configured with a context interpreter and/or an intent processor 112, etc. In multi-device implementations, the various devices of the speech processing service 106 may communicate via an internal communication network, such as a corporate or university network configured as a local area network ("LAN") or a wide area network ("WAN"). In some cases, the devices of the speech processing service 106 may communicate over an external network, such as the Internet, or a combination of internal and external networks.

In some embodiments, the features and services provided by the speech processing service 106 may be implemented as web services consumable via a communication network. In further embodiments, the speech processing service 106 is provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

In some embodiments, the features of the speech processing service 106 may be integrated into the voice communications device such that network connection and one or more separate computing systems are not necessary to perform the processes of the present disclosure. For example, a single voice communications device may include the microphone 104, the ASR module 108, the NLU module 110, an intent processor 112, or some combination thereof.

As described, users may submit utterances that may include various commands, requests, and the like. The microphone 302 may capture utterance audio and provide the audio (or data derived therefrom) to the speech processing service 106. The ASR module 108 may generate ASR results for the utterance, such as a w-best list of transcriptions. Each transcription or portion thereof may be associated with some score, such as a confidence score or a likelihood that the transcription or portion thereof is correct. The w-best list or some other type of results may be provided to the NLU module 110 so that the user's intent may be determined. A w-best list of interpretations (e.g., intents) may be determined or generated by the NLU module 110. A context interpreter portion of the NLU module 110 can process the NLU results (e.g., modify individual interpretations, filter interpretations, re-score or re-rank interpretations, etc.). The result can include call request information indicating a specific target for connection. In accordance with various embodiments, the result can be provided to the action service 116, such as a call routing service 420 in FIG. 4, to attempt to establish the requested connection.

Figure 4:
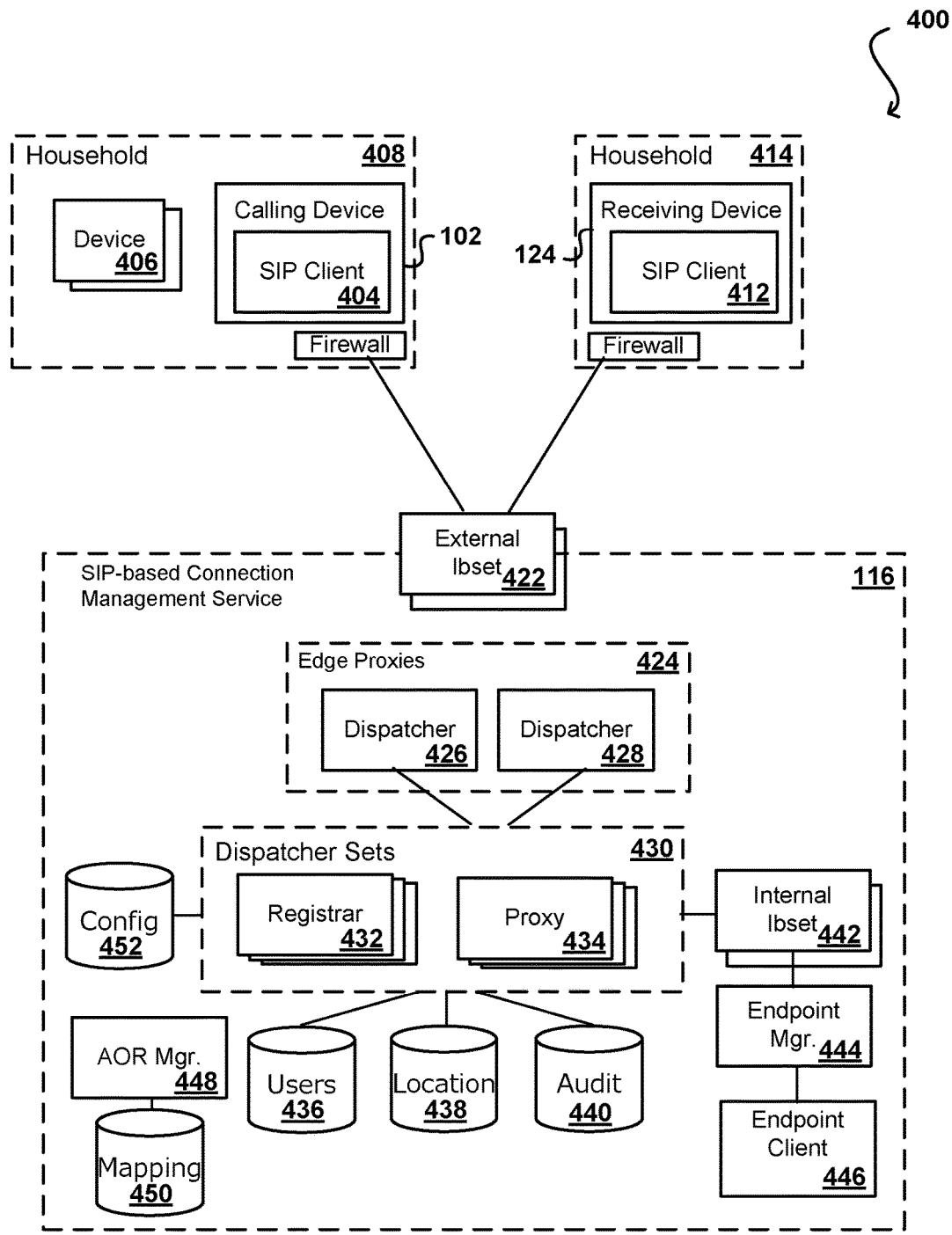
FIG. 4 illustrates an example call routing system that can be utilized in accordance with various embodiments.

FIG. 4 illustrates an example SIP-based system 400 including a connection management service 116 that can be utilized in accordance with various embodiments. In this example, a calling device such as a voice communications device 102 can include a SIP client 404, or user agent, that enables the device 102 to send and receive SIP communications. The device 102 can be associated with other SIP-enabled devices 406 as part of a first household 408 as will be discussed in more detail later herein. The devices of the household 408 can be behind a firewall or router, but can otherwise send requests across at least one network (not shown) that can be received to the connection management service 116. As discussed with respect to FIG. 1, the request might first pass through one or more other services or system, such as a speech processing service, at least for the initial connection request. A target of the request might be another receiving device 124 executing a SIP client 412 or user agent as part of a different household 414.

In some embodiments, the connection requests can be received to an external endpoint or load balancer (e.g., external lbset 422) that can route the communications to an appropriate location based upon factors such as current load and the type of action to be taken. This example service includes one or more dispatchers 426, 428 or other components functioning as a set of edge proxies 424. These can be SIP edge proxies that keep track of incoming socket connections opened by devices to enable inbound calling, and can provide denial of service protection. The edge proxies can also provide for intrusion detection, and can prevent client connections from being affected when restarting registrars or proxies, such as when upgrading them. The registrar can be a SIP registrar that authenticates registration requests. The registrar can validate the access token using a validation process based on the token type (e.g., MAP). The registrar 432 can also create the binding between the AOR and the contact SIP URI, and can use the location data store 438 and users data store 436 for persistence. The users data store 436 can store provisioned users and their SIP domains. The data can keep track of the user to provisional phone number to enable ringing the device(s) when a PSTN service provider sends an incoming invite request from an external phone. The users data store 436 can also maintain the mappings between any external keys such as the customer ID and corresponding AOR, as discussed elsewhere herein in more detail. The location data store 438 can function as the persistent storage used by the registrar 432 and the proxy 434, containing tracks of active registrations or mappings between the AOR and contact SIP URI, as well as mappings between registered devices and device UUIDs that uniquely identify those devices. This information can be used to invite a specific device to participate in a session.

The proxy 434 can be a SIP proxy that enables SIP clients 404, 412 to send requests to invite others. Based on the contact URI of the call target, or callee, the proxy can determine whether it is a local contact (at least to that network or system) or whether the requests needs to be routed to a service provider or other entity. The proxy can also mediate calls to and from external phone numbers by leveraging PSTN/third party service providers, and can enable ringing or calling of all the devices of a callee as determined using the AOR manager 448 and mappings contained in the mappings data store 450, which can be used to resolve the various addresses. The proxy 434 can also generate call log data for tasks such as metric gathering and accounting, as may be stored to an audit data store 440 or other such location. From the dispatcher sets 430, another set of internal load balancers and routers 442 can enable information to be shared with an endpoint management service 444 and endpoint client 446, which can retrieve the AOR for a determined customer ID through communication with an intent processor as discussed previously. The load balancers 422, 442 can include active and passive load balancers, as may provide a public endpoint VIP for SIP clients to reach the edge proxies over the Internet. External load balancers 422 can be configured with the TCP protocol and can pass packets through to the dispatcher layer of edge proxies 424. The endpoint management service 444 can abstract the registrar and proxy operations into a service that can be called by an endpoint such as the endpoint client 446. The service can provide an API to query the AORs or Contact URIs used for registration or calling a customer's contact. Given an external reference such as a customer ID, an endpoint client 446 can retrieve the relevant AOR. The service can also provide an API to discover a customer's AOR for registering, as well as a contact's URI that can be passed on in an invite request to ring all of the devices of the contact. Another API can be used to discover a contact's specific device's SIP URI that can be passed on in an invite request to call a specific device directly instead of ringing all of the contact's devices. This can utilize an additional input field, such as for the contact device's UUID. The endpoint management service 444 can also vent out the IP addresses of the edge proxies 424. The endpoint client 446 can retrieve these IP addresses and pass to them to the device so that the device can connect to the proxy 430. This can be used as an override to using DNS SRV, for example, and can be more flexible in at least some situations.

There can be at least two types of endpoint clients 446 utilized by the endpoint management service 444, at least in the initial phases of the project. A first type can provision a new user, for a given external entity such as customer ID, and add the user's provisioned phone number as an alias. A provisioning request in some embodiments needs to be made to create a new AOR. Another type of endpoint client 446 can be utilized that can discover a given customer's AOR for registration to invite a customer's devices, and can optionally pass the device UUID to invite a specific device of contact. The SIP clients 404, 412, on the other hand, can include any software module that has SIP user agent capabilities. A SIP client 404, 412 can obtain and pass the necessary access token to register for authentication. Depending at least in part upon the capability of the client, the client can use a MAP access token or a device token, among other such options. The SIP client 404, 412 can register with the registrar 432 to keep a persistent TLS connection open to allow inbound calls. During registration the client can pass the device UUID indicating where they can be reached for direct invitation instead of inviting all of the devices. The SIP client can also re-register after expiration of registration or loss of network connectivity. The SIP client can also make outbound calls, either to another device 406 or an external phone number, by sending an invite request to the SIP proxy 434.

The service 116 can also include a configuration data store 452 that can store the configurations of the registrar 432 and the endpoint management service 444. The configuration data store 452 can provide configuration versioning capability, and can be changed without deploying any additional packages in at least some embodiments. The audit data store 440 can also store audit log data for any or all activities, including invite and corresponding bye messages for purposes such as metric gathering and billing.

Such a service enables IP-based phones, and other SIP clients, to register with a central service such that the device's location can be determined when needed to receive an incoming call or communication. The location can be identified by an IP address and a port number. For many devices the IP address is not fixed, such that registration can be required to locate the device. The registrar 432 can perform this registration to enable these communications. The SIP client typically sends a register request to the registrar, which can ensure that the user credentials are correct and then update the location data store 438, with information such as an IP address and port number for a recipient, and send an acknowledge response back to the SIP client. In some embodiments the SIP client will automatically repeat the registration process at periodic intervals. The data located in the location data store 438 can include mappings between the public address of the user and the current IP address of the SIP client for a device. The public address is typically referred to as the address of record (AOR), as discussed in more detail elsewhere herein. In order to prevent the details for a user's device from being exposed to unintended third parties, a SIP proxy 430 can sit between third party callers and the private data stored by the location data store 438. SIP clients attempting to contact a user can send an invite request to the relevant SIP proxy 434, which can access the data in the location data store 438 in order to direct the invite request to the correct endpoint or destination. A SIP proxy 434 can be at least one server that hosts a SIP domain, enabling the appropriate SIP proxy to be located via the SIP domain name.

A new device or SIP client can attempt to register with the connection management service 116. A SIP register request can be submitted that is directed to a registrar 432, which can be one of a set of registrars that can include the location server functionality, or work with separate location servers in other embodiments. The registration is performed automatically in some embodiments when the device hosting the SIP client is powered on. The registration can involve some type of authentication, as may involve a username and password, although other identifiers or credentials can be used as well within the scope of the various embodiments. In some embodiments the user ID for a SIP device is the device phone number. The registration process will associate the device, as an endpoint, with an address of record (AOR). Once registered, calls can be routed to the device using the AOR.

In many instances, a user will have multiple devices that can be used to send and receive SIP-based (or other network-based) communications. For example, a user might have one or more smart phones, a tablet computer, a desktop computer, a voice communications device, a smart television, etc. In order to enable a user to communicate using any of these devices, the SIP protocol enables the user to register each of these devices as a separate endpoint associated with a single AOR for that user, as may be formatted as a SIP URI. The user AOR can thus be used as a basic grouping mechanism, whereby an incoming call connection request for a user can potentially be directed to any and all endpoints associated with the user and registered against the user AOR. The user AOR for personal devices associated only with that particular user will be referred to herein as a "personal AOR." Any call request to the personal AOR could cause all registered endpoints for that AOR to ring (or otherwise prompt the user).

It will often be the case, however, that at least some of these devices will be shared among multiple users. For example, a household might have a voice communications device (e.g., an Amazon Alexa) or smart television in a room, where that household is inhabited by multiple people. The people will typically not have one of these devices for each member of the household, but will share these devices among multiple users. Similarly, users might share devices such as desktop computers, tablets, and gaming systems as well. If these shared devices, or "communal devices" as referred to herein, are only registered against a personal AOR for one of these users, then only that user will be able to receive personal communications via that device. Further, only that user's contacts might be available for connection via the device.

Figure 5A:
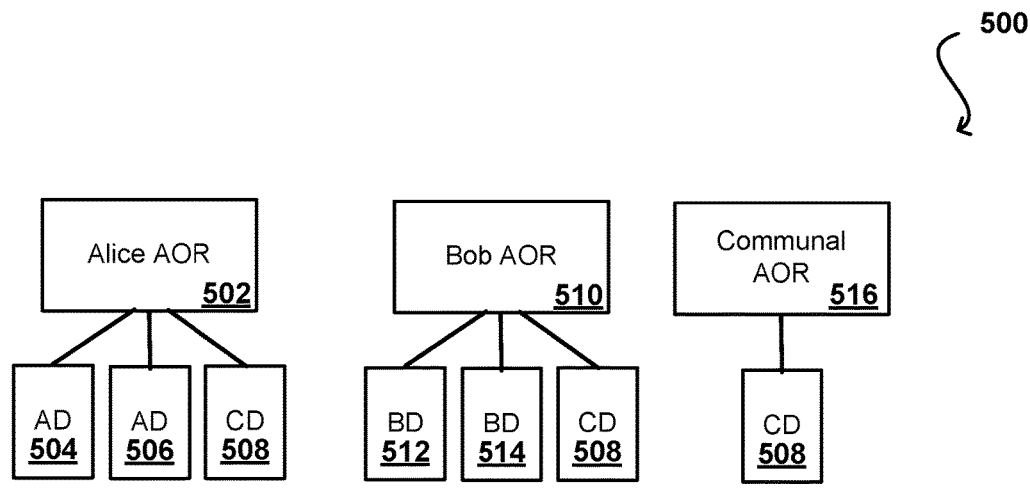
FIGS. 5A, 5B, 5C, and 5D illustrate example endpoint to address mappings that can be generated in accordance with various embodiments.

Accordingly, various systems and services enable devices to also be registered against a separate AOR, herein referred to as a "communal AOR." FIG. 5A illustrates an example mapping 500 resulting from AOR registration that can be utilized in accordance with various embodiments. In this example there are two users, Alice and Bob, who live together in a household. Alice has her own devices (AD) 504, 506, and Bob has his own devices (BD) 512, 514. Alice and Bob also share a communal device (CD) 508. Each of Alice's devices 504, 506 can register against Alice's personal AOR 502, and each of Bob's devices 512, 514 can register against Bob's personal AOR 510. In this way, someone attempting to establish a call with either user can call that person's respective personal AOR. The communal device 508 can also be registered against a communal AOR 516. Thus, someone attempting to reach either Alice or Bob, or both, can attempt to establish a call using the communal AOR 516.

Because the communal device is shared by both Alice and Bob, it may be desirable in at least some situations for the communal device to ring when a communication is attempted for either Alice or Bob. If the communal device 508 is only registered against the communal AOR 516, however, the communal device will not ring when a call is directed to Alice's or Bob's personal AOR's. One solution would be to attempt to have calls directed to both the respective personal and communal AORs, but this creates additional complexity and places at least some of the burden on the caller to be up to date as to the appropriate devices or records. A communication management service could allow a device to be registered against multiple AORs. As illustrated in FIG. 5A, the communal device 508 is registered against Alice's personal AOR 502, Bob's personal AOR 510, and the communal AOR 516. Such an approach with multiple registrations complicates endpoint logic, however, and would require additional resources and effort to maintain.

Accordingly, approaches in accordance with various embodiments utilize virtual addresses of record (VAORs) to enable grouping of endpoints by different users or user groups. Such an approach enables devices to only be registered as endpoints against a single AOR, but enable a caller to specify a single VAOR that can then be mapped to the relevant AORS so the call requests can be directed to the appropriate devices. An AOR management service, such as the one 448 discussed with respect to FIG. 4, can maintain mappings between the various AORs and VAORs such that a SIP request can be received for a VAOR and then treated as if received for multiple appropriate AORs depending upon the appropriate record mappings.

Figure 5B:
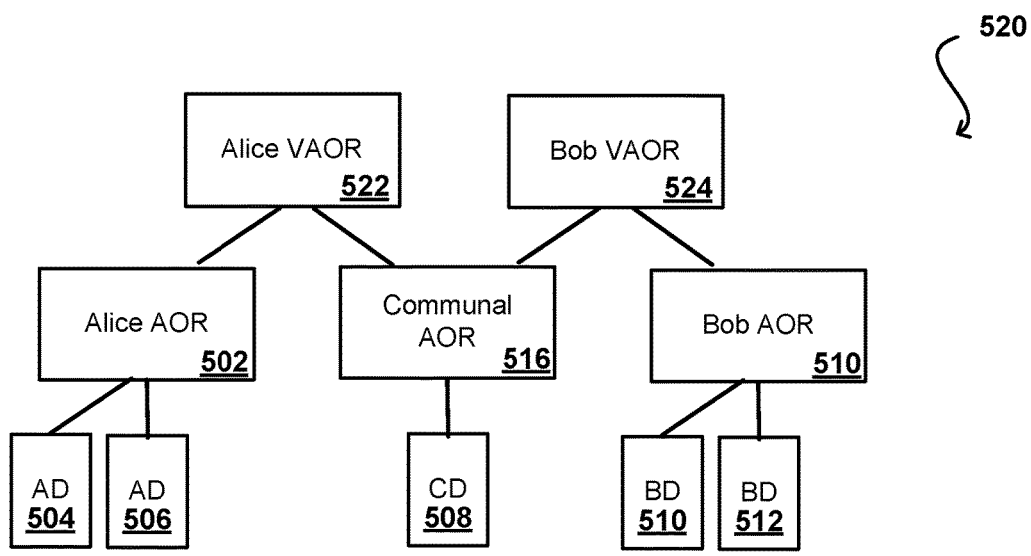

FIG. 5B illustrates an example mapping approach 520 that can be utilized in accordance with various embodiments. In this example, Alice's devices 504, 506 are registered only with Alice's personal AOR 502, and Bob's devices 510, 512 are registered only with Bob's personal AOR 510. The communal device 508 is registered as an endpoint only with the communal AOR 516. In order to enable the communal device 508 to ring when either Alice or Bob is called, the service utilizes a first VAOR 522 for Alice and a second VAOR 524 for Bob. Each virtual AOR is mapped to the personal AOR for the respective user, as well as the communal AOR. Thus, a call for Alice can be directed to Alice's VAOR 522, which is mapped to Alice's personal AOR 502 and the communal AOR 516. The call to the single VAOR can then cause Alice's personal devices 504, 506 and the communal device 508 to ring (or otherwise provide notification of an incoming call or communication). In some devices, the communal device might only ring if and when Alice is logged in or otherwise has an active session on the device, among other such options. A single VAOR can thus map to multiple AORs, GRUUs, or other such records or endpoints. A GRUU is a globally routable user agent URI, or SIP URI, that identifies a specific user agent, or an endpoint where a user is signed on, is routable, and remains valid for a period of time.

Figure 5C:
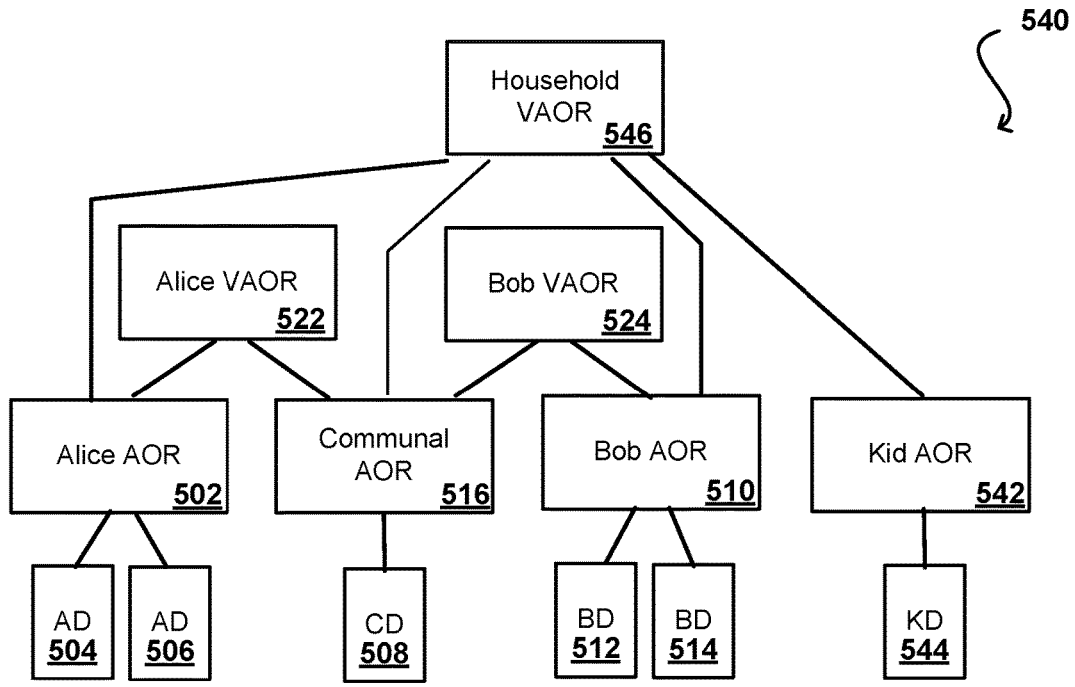
Figure 5D:
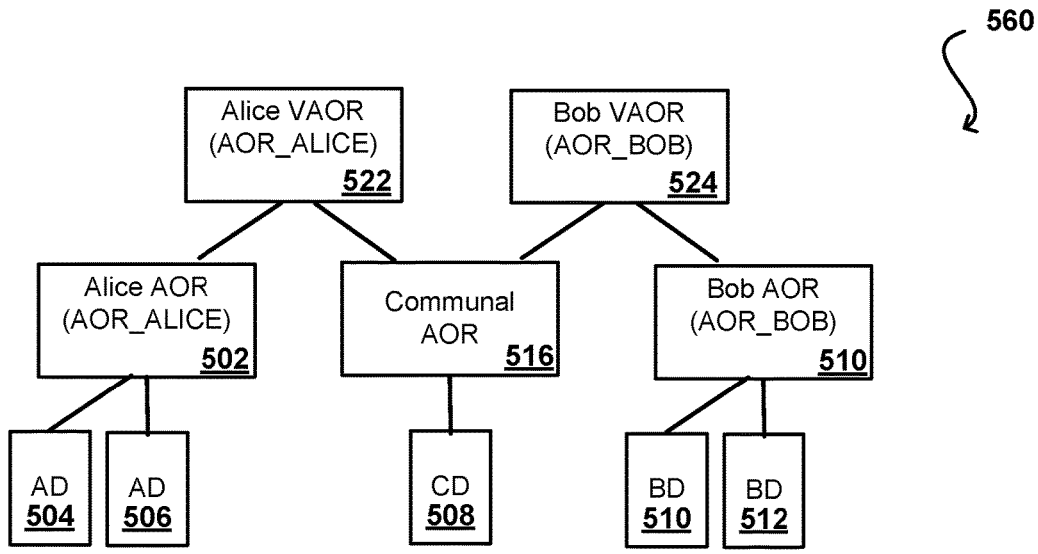

There may be additional groupings that can also take advantage of additional VAORs. For example, the mapping 540 of FIG. 5C includes the aforementioned devices and AORs for both Alice and Bob. In this example, Alice and Bob also have a child who has his or her own device (KD) 544. This device is associated with the kid's personal AOR 542, and is not a communal device. Thus, an additional VAOR for the entire household can be created, herein referred to as the household VAOR 546, which can be mapped to each device in the household regardless of whether the device is a personal device or a communal device. The household VAOR thus can map to the appropriate AORs. In systems where VAORs may be allowed to map to other VAORs, the household VAOR may instead be allowed to map to the VAORs for Alice and Bob, as well as the AOR for the child, in order to map to all relevant devices. In this way, someone wanting to reach any person in the household, such as in response to someone issuing a request to "call home," can call the household VAOR 546, and someone trying to reach one of the household members can call their personal AORs or VAORs, etc. When a new device is registered, the device can be registered to one of the personal AORs 502, 510, 542 or the communal AOR 516. If a new member of the household is added then a new personal AOR can be created, or if that person already has a personal AOR then that personal AOR can be added to the household mapping accordingly. If new communal devices are added, or devices become communal, the device can be registered to a new communal AOR or have its registration (or mapping) updated to the appropriate existing AOR (or VAOR). Similarly, mappings can be updated as users or devices are removed, etc.

The use of these VAORs enables the user account control (UAC) logic of the connection management service to direct calls, received to a single VAOR, to endpoints registered with multiple AORs. Such usage of VAORs can complicate the UAC logic and the required infrastructure, however. For example, the UAC logic needs to know how to map Bob to his VAOR and when to use the mapping. Further, a service is required in at least some embodiments to create and maintain the mappings, and extra cleanup is required when those mappings become stale or out of date.

Accordingly, approaches in accordance with various embodiments can attempt to reuse at least some of the AOR values as VAOR values. Consider the example mapping 520 of FIG. 5B. In order to support the personal and communal devices of Bob and Alice, two additional VAORs were created that introduced additional mappings now needed to be maintained for the five total records, including the AORs and VAORs. In order to simplify the mappings, the value (here AOR_ALICE) used for Alice's personal AOR 502 can also be used as the value for Alice's VAOR 522. Similarly, the value AOR_BOB used for Bob's personal AOR 510 can be used as the value for Bob's VAOR 524. As illustrated, each device is still only registered with a single AOR. The values for both personal AORs 502, 510, however, are the same as the values for the personal VAORs 522, 524 which enables the same value to be utilized by clients or peers to connect to these devices. The call to the value AOR_ALICE can ring all devices associated with Alice per the mappings. This approach significantly reduces the management and complexity of the mapping.

In some cases, however, complex mappings might advantageously utilize VAORs for groupings. Accordingly, some intelligence can be used to determine when to use AORs as VAORs, and when to introduce VAORs. For example, the VAORs can be provisioned intelligently so that household VAORs will be included in the set of mapped AORs, etc. Various rules or policies can be put in place that determine when to add a VAOR or when to reuse an AOR. The usage and number of records can be updated over time as the number of users or devices changes, or as the communal aspects of various devices change, among other such options. In some embodiments a person can reach all devices for a user by calling that user's AOR whether the user is a member of a household or not. Further, such an approach does not require the knowledge of different addresses for a single user. Otherwise the logic behind the scenes can remain unchanged an only the mappings can be updated as appropriate.

Figure 6:
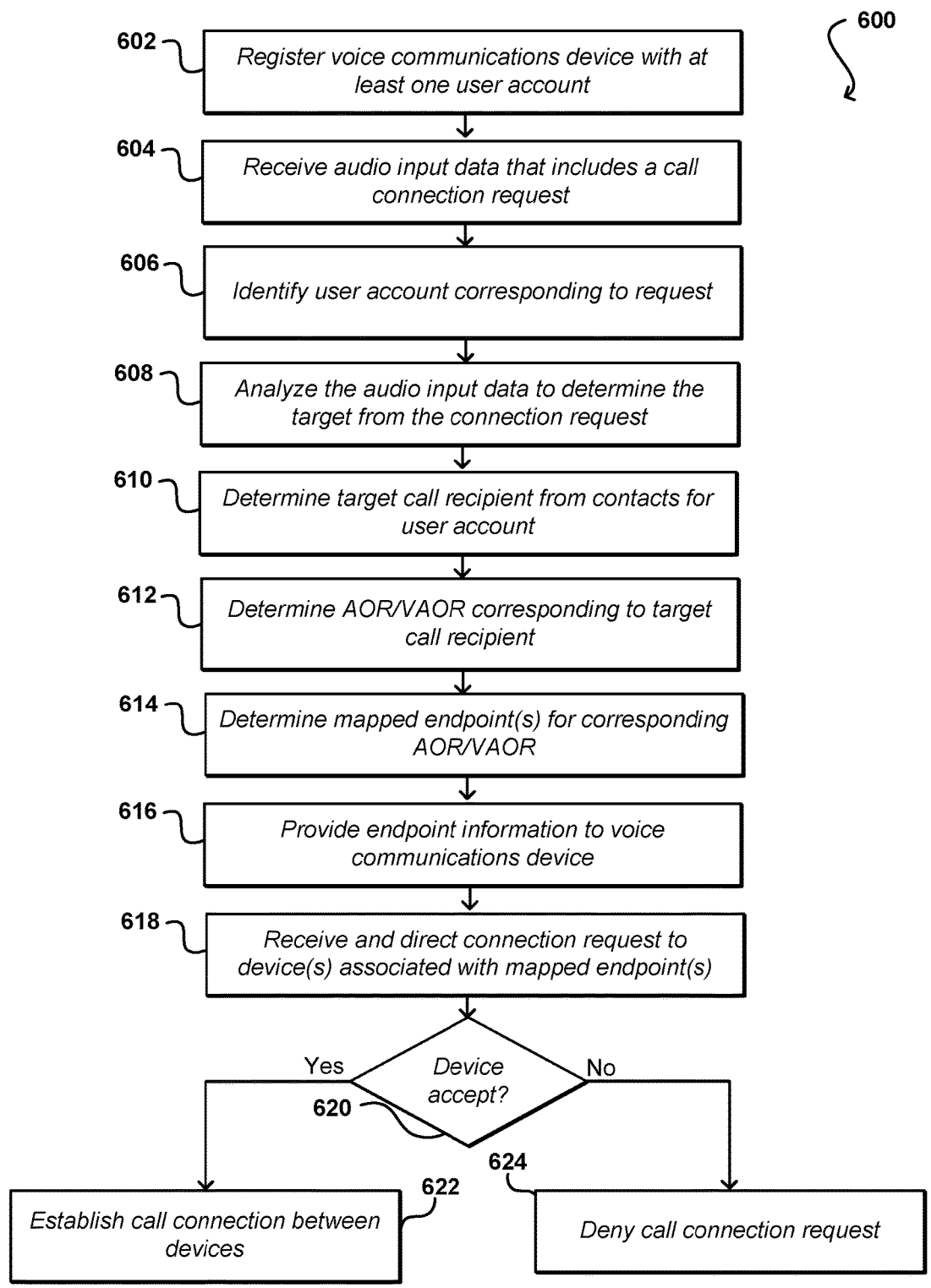
FIG. 6 illustrates an example process for establishing a call connection in response to a received voice command that can be utilized in accordance with various embodiments.

FIG. 6 illustrates an example process 600 for connecting a call request that can be used in accordance with various embodiments. It should be understood that, for any process discussed herein, there can be additional, fewer, or alternative steps performed in similar or alternative orders, or in parallel, within the scope of the various embodiments unless otherwise stated. In this example, a voice communications device is registered 602 with at least one user account. This can include, for example, being authenticated using user account credentials and then registering the device with a SIP register, or other register server of a communications management service, etc. Various other types of devices or user agents can be registered for a user as well as discussed elsewhere herein. Subsequent to the registry, audio input data can be received 604 from the voice communications device (to, for example, a speech processing service) that includes a call connection request. As mentioned, this audio input data may have been generated when voice data was detected by the voice communications device along with the wake word, and audio data detected after (or proximate to) the wake word is submitted as audio input data. In some embodiments text processing or other processing of the voice data may have been performed as well.

In this example, a user account corresponding to the request can be determined 606. This can be used to ensure that the request is authorized to perform the requested action, as well as to determine an appropriate contacts list or other data source to reference. The audio input data can be analyzed 608 as discussed and suggested herein to determine that the request is a call connection request as well as the target of the call connection request. This can include determining 610 the target call recipient using the associated user contacts list, among other such options. For example, if the call connection request includes "call Alice" then the lookup would attempt to determine the appropriate contact information for Alice. If the correct Alice cannot be determined with certainty then additional information or action might be taken to determine the correct target as discussed elsewhere herein. Once the appropriate contact information is determined, such as the appropriate user identifier or AOR, a request can be sent (or redirected, etc.) to a call routing or management system or service. The call management service can determine 612 (or verify) the appropriate AORs or VAORs for the target call recipient. This can include, for example, consulting a mapping management service to determine any other AORs or VAORs mapped to the target AOR or VAOR. The service can also determine 614 the endpoints mapped to the respective AORs and/or VAORs. The appropriate AOR/endpoint information can then be provided 616 to the voice communications device, which can use that information to submit a call connection request to the connection management service. The connection management service can receive 618 the request and direct the request to the device associated with each of those endpoints. A determination can be made 620 as to whether any of those devices accepted the call. Once one device accepts then the others may be unable to accept, etc. If a device accepts then a call connection can be established 622 between the calling and accepting devices. If none of the devices accepted the request then the call connection request can be denied or otherwise handled accordingly.

Figure 7A:
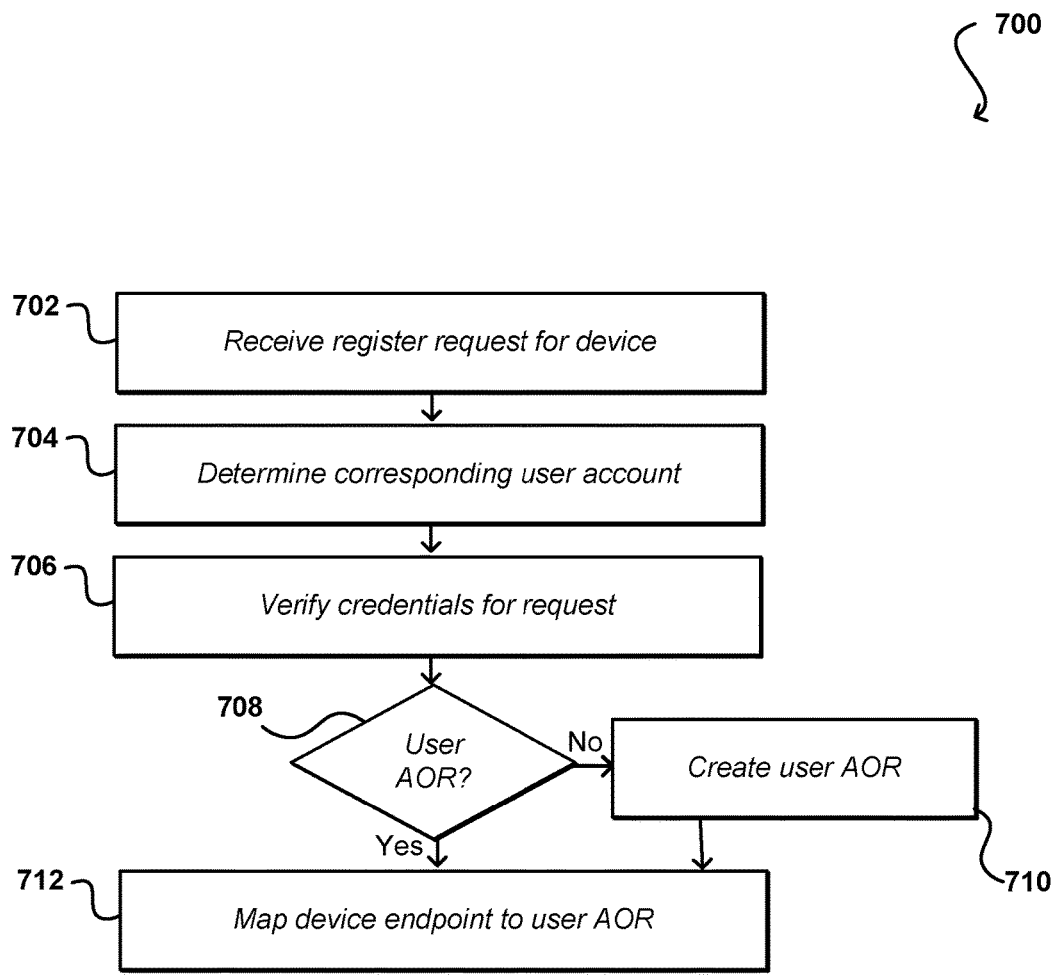
FIGS. 7A and 7B illustrate portions of an example process for registering a new device or endpoint that can be utilized in accordance with various embodiments.

FIG. 7A illustrates a first portion 700 of an example registration process that can be utilized to register a device with a SIP-based communication management service in accordance with various embodiments. In this example, a register request is received 702 for a specified device. The request can include device identifying information, user identifying information, and/or other such information. A corresponding user account can be determined 704, which can include user credentials and information for the type of connections and devices supported, among other such options. The credentials for the request can be verified 706, to ensure that the request is valid for the user account and the device is authorized to be registered under the user account. A determination can be made 708 as to whether the user already has a personal AOR. If not, then a new personal AOR for the user can be created 710. The device can then be mapped 712 to the user AOR.

Figure 7B:
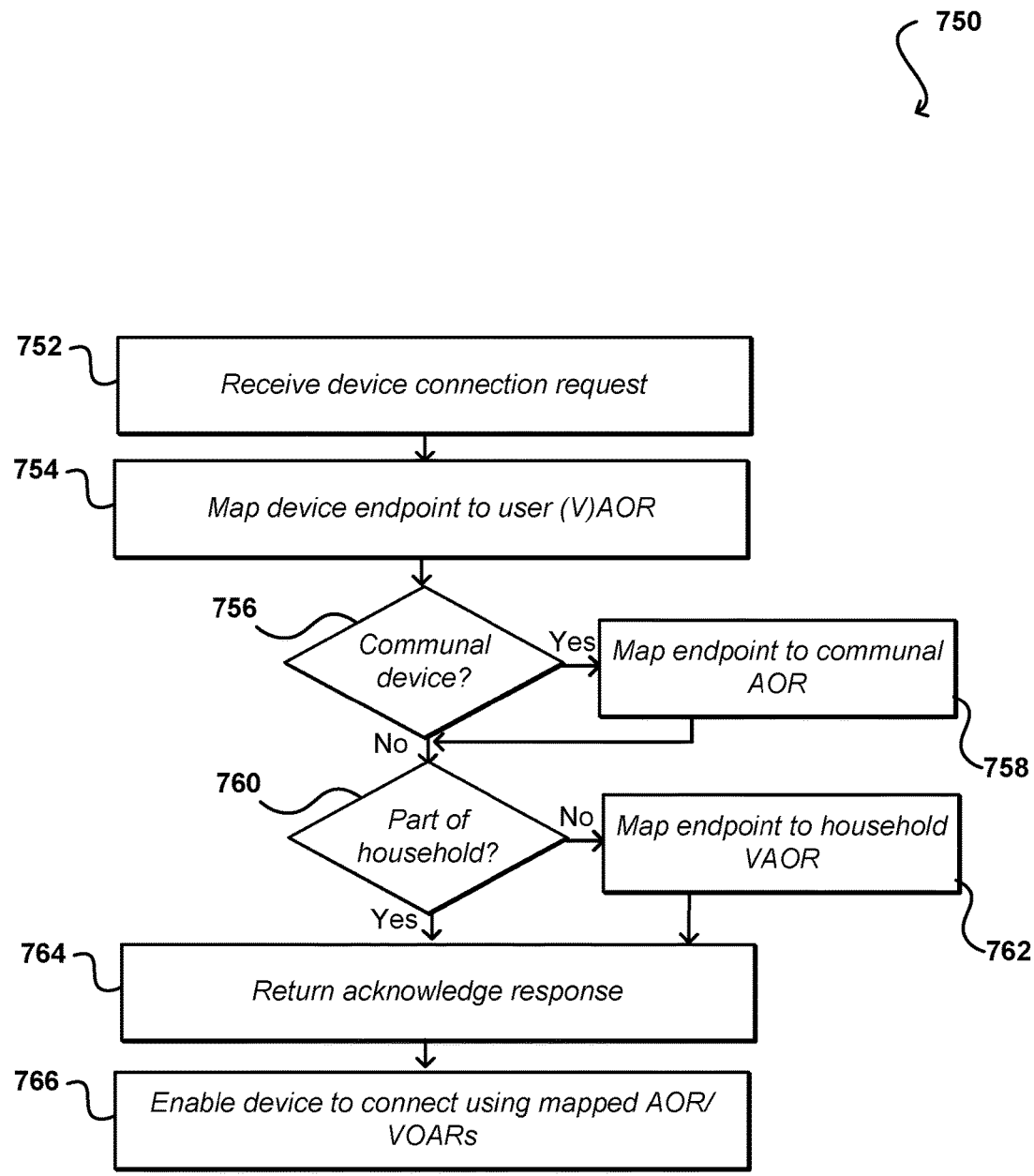

FIG. 7B illustrates a second portion 750 of an example registration process that can be utilized in accordance with various embodiments. In this portion, the device is already registered with the SIP registry but will attempt to connect to the SIP service upon a boot or similar action or event. A connection request can be received 752 from the device in response to such an action. The device can be mapped, per the determined AOR and/or mappings, to a user AOR/VAOR, and that mapping determined 754. If the device is determined 756 to be a communal device, and not a personal device, then the endpoint can instead (or additional in some embodiments) be mapped 758 to a communal AOR/VAOR or other such address. If the user is determined 760 to be part of a household then the AOR or VAOR for the device can be mapped 762 to the household VAOR as well. As mentioned, in some embodiments an AOR may be reused as a VAOR based upon the associations of the devices or other such aspects. Once the registration is complete and the mappings determined, an acknowledge response can be returned 764 to the requesting device. Once registered, the device (or a SIP agent executing on the device) can be enabled 766 to make and/or receive calls directed to those mapped AORs/VAORs.

Figure 8:
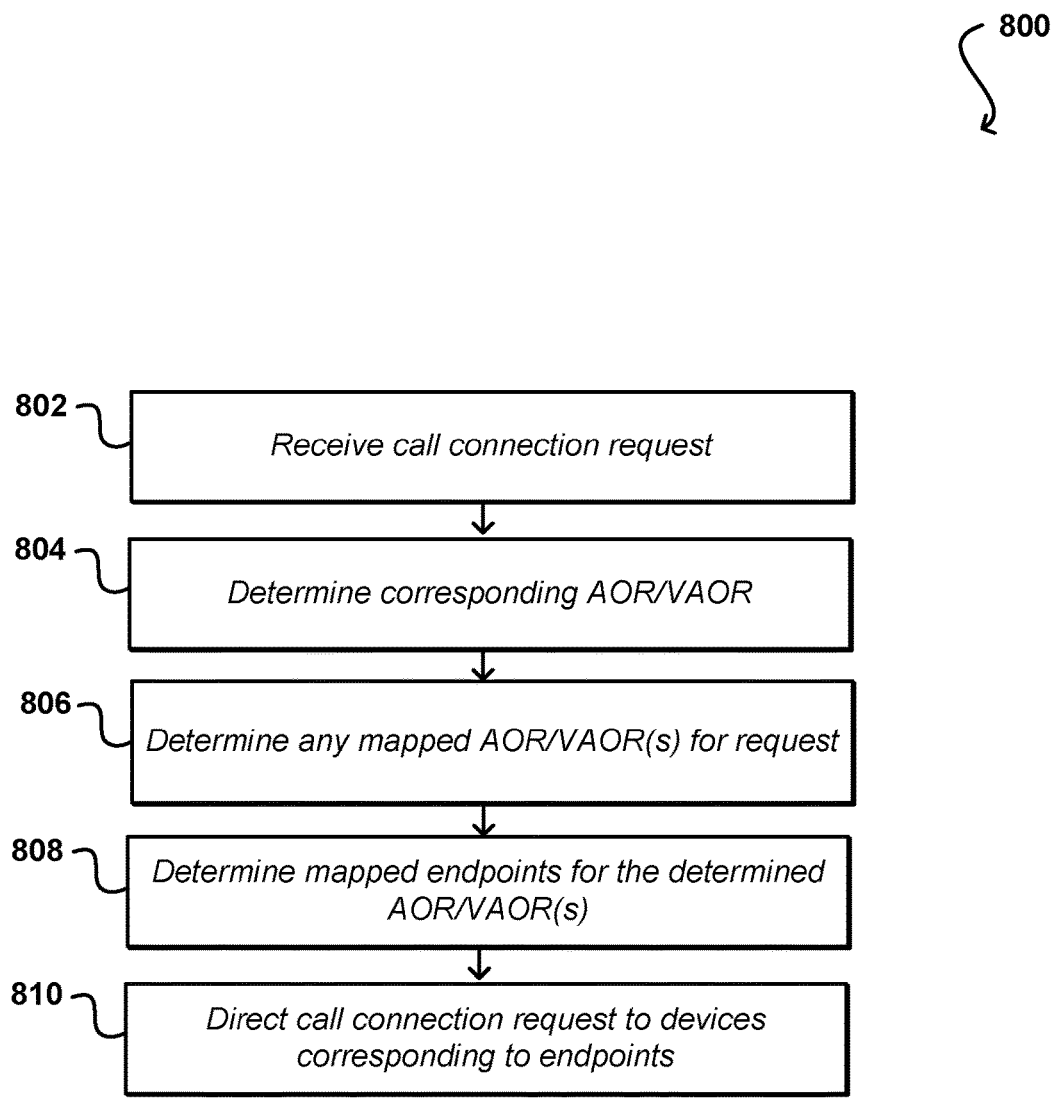
FIG. 8 illustrates an example process for routing a call based on endpoint and record mappings that can be utilized in accordance with various embodiments.

FIG. 8 illustrates an example process 800 for directing a call using mapped AORs/VAORs that can be utilized in accordance with various embodiments. In this example, a call connection request is received 802, from a SIP client, audio processing system, or other such system or service. The corresponding AOR/VAOR for the request can be determined 804, such as by an intent processor, based at least in part upon the identified target for the request. Any mapped AORs or VAORs for the request can be determined 806, as may relate to communal or household aspects of the target, among other such groupings. The corresponding endpoints for the request can then be determined 808, such as by an AOR management service, based at least in part upon their mappings or registrations to the determined AORs/VAORs for the request. Once determined, a call connection request can be directed 810 to the device or SIP agent associated with each identified endpoint for the request. If accepted, the connection can be established as discussed elsewhere herein.

Figure 9:
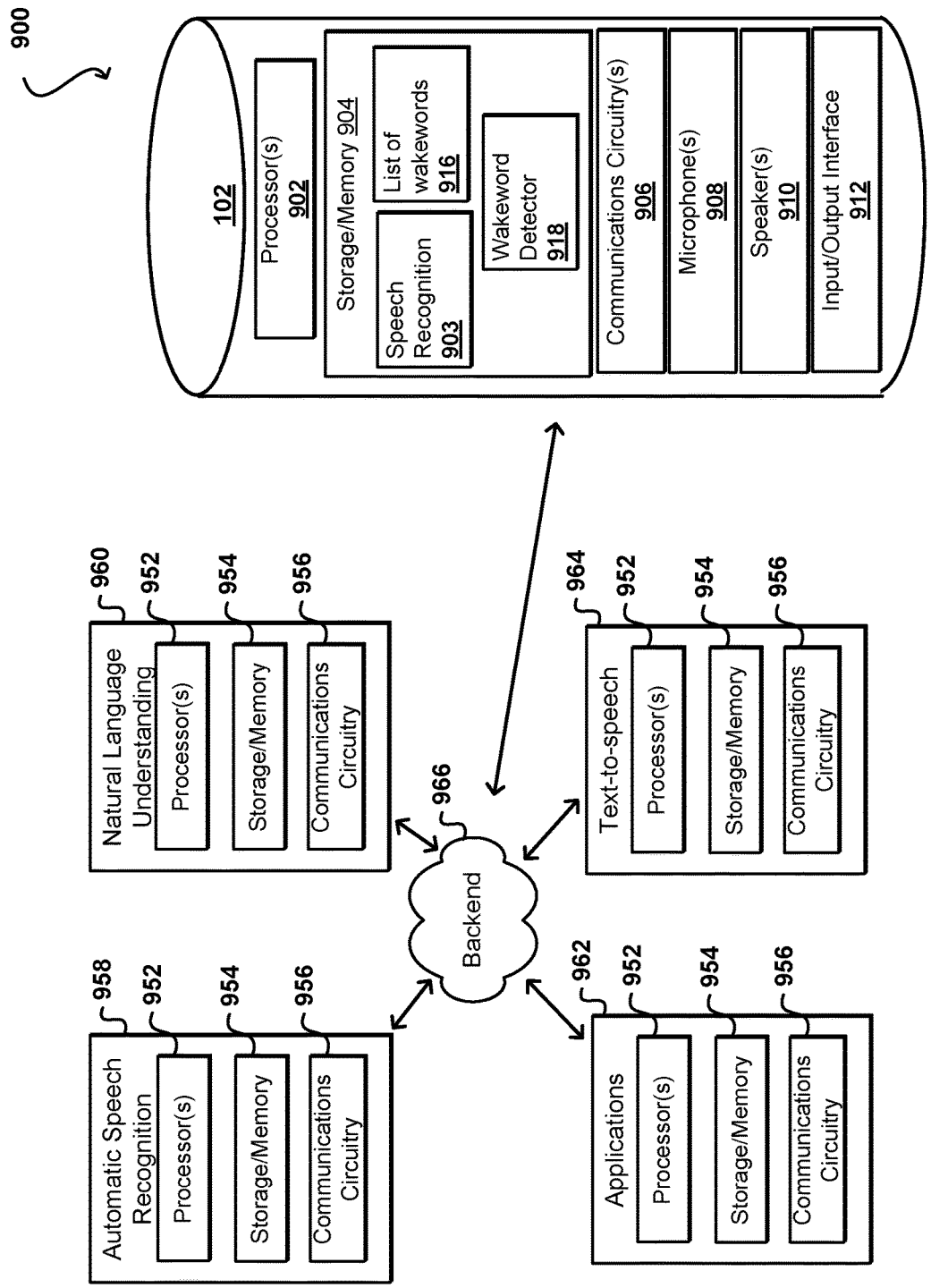
FIG. 9 illustrates an example voice processing system that can be utilized in accordance with various embodiments.

FIG. 9 illustrates an example environment 900 for implementing aspects in accordance with various embodiments. In this example, voice-enabled comunications device 102, in some embodiments, may correspond to any type of electronic device capable of being activated in response to detecting a specific sound. Voice-enabled comunications device 102 may, in some embodiments, after detecting the specific sound (e.g., a wakeword), recognize commands (e.g., audio commands, inputs) within captured audio, and may perform one or more actions in response to the received commands. Various types of electronic devices may include, but are not limited to, notebook computers, ultrabooks, tablet computers, mobile phones, smart phones, personal data assistants, video gaming consoles, televisions, set top boxes, smart televisions, portable media players, and wearable computers (e.g., smart watches, smart glasses, bracelets, etc.), display screens, displayless devices (e.g., Amazon Echo), other types of display-based devices, smart furniture, smart household devices, smart vehicles, smart transportation devices, and/or smart accessories, among others. In some embodiments, voice-enabled comunications device 102 may be relatively simple or basic in structure such that no mechanical input option(s) (e.g., keyboard, mouse, trackpad) or touch input(s) (e.g., touchscreen, buttons) may be provided. For example, voice-enabled comunications device 102 may be capable of receiving and outputting audio, and may include power, processing capabilities, storage/memory capabilities, and communication capabilities.

Voice-enabled comunications device 102 may include a minimal number of input mechanisms, such as a power on/off switch, however primary functionality, in one embodiment, of voice-enabled comunications device 102 may solely be through audio input and audio output. For example, voice-enabled comunications device 102 may listen for a wakeword by continually monitoring local audio. In response to the wakeword being detected, voice-enabled comunications device 102 may establish a connection with backend server 1008, send audio input data to backend server 1008, and await/receive a response from backend server 1008. In some embodiments, however, non-voice-enabled devices may also communicate with backend server 1008 (e.g., push-to-talk devices).

Voice-enabled comunications device 102 may include one or more processors 902, storage/memory 904, communications circuitry 906, one or more microphones 908 or other audio input devices (e.g., transducers), one or more speakers 910 or other audio output devices, as well as an optional visual input/output ("I/O") interface 912. However, one or more additional components may be included within voice-enabled comunications device 102, and/or one or more components may be omitted. For example, voice-enabled comunications device 102 may include a power supply or a bus connector. As another example, voice-enabled comunications device 102 may not include a visual I/O interface. Furthermore, while multiple instances of one or more components may be included within voice-enabled comunications device 102, for simplicity only one of each component has been shown.

Processor(s) 902 may include any suitable processing circuitry capable of controlling operations and functionality of voice-enabled comunications device 102, as well as facilitating communications between various components within voice-enabled comunications device 102. In some embodiments, processor(s) 902 may include a central processing unit ("CPU"), a graphic processing unit ("GPU"), one or more microprocessors, a digital signal processor, or any other type of processor, or any combination thereof. In some embodiments, the functionality of processor(s) 902 may be performed by one or more hardware logic components including, but not limited to, field-programmable gate arrays ("FPGA"), application specific integrated circuits ("ASICs"), application-specific standard products ("ASSPs"), system-on-chip systems ("SOCs"), and/or complex programmable logic devices ("CPLDs"). Furthermore, each of processor(s) 902 may include its own local memory, which may store program modules, program data, and/or one or more operating systems. However, processor(s) 902 may run an operating system ("OS") for voice-enabled comunications device 102, and/or one or more firmware applications, media applications, and/or applications resident thereon.

Storage/memory 904 may include one or more types of storage mediums such as any volatile or non-volatile memory, or any removable or non-removable memory implemented in any suitable manner to store data on voice-enabled comunications device 102. For example, information may be stored using computer-readable instructions, data structures, and/or program modules. Various types of storage/memory may include, but are not limited to, hard drives, solid state drives, flash memory, permanent memory (e.g., ROM), electronically erasable programmable read-only memory ("EEPROM"), CD-ROM, digital versatile disk ("DVD") or other optical storage medium, magnetic cassettes, magnetic tape, magnetic disk storage or other magnetic storage devices, RAID storage systems, or any other storage type, or any combination thereof. Furthermore, storage/memory 904 may be implemented as computer-readable storage media ("CRSM"), which may be any available physical media accessible by processor(s) 902 to execute one or more instructions stored within storage/memory 904. In some embodiments, one or more applications (e.g., gaming, music, video, calendars, lists, etc.) may be run by processor(s) 902, and may be stored in memory 904.

In some embodiments, storage/memory 904 may include one or more modules and/or databases, such as speech recognition module 903, list of wakewords database 916, and wakeword detection module 918. Speech recognition module 903 may, for example, include an automatic speech recognition ("ASR") component that recognizes human speech in detected audio. Speech recognition module 903 may also include a natural language understanding ("NLU") component that determines user intent based on the detected audio. Also included within speech recognition module 903 may be a text-to-speech ("TTS") component capable of converting text to speech to be outputted by speaker(s) 910, and/or a speech-to-text ("STT") component capable of converting received audio signals into text to be sent to backend server 908 for processing.

List of wakewords database 916 may be a database stored locally on voice-enabled comunications device 102 that includes a list of a current wakeword for voice-enabled comunications device 102, as well as one or more previously used, or alternative, wakewords for voice-enabled comunications device. In some embodiments, user 102 may set or program a wakeword for voice-enabled comunications device 102. The wakeword may be programmed directly on voice-enabled comunications device 102, or a wakeword or words may be set by the individual via a backend server application (app) that is in communication with backend server 908. For example, a user may use their mobile device having the backend server application running thereon to set the wakeword. The specific wakeword may then be comunicated from the mobile device to backend server 908, which in turn may send/notify voice-enabled comunications device 102 of the individual's selection for the wakeword. The selected activation may then be stored in list of wakewords database 916 of storage/memory 904.

Wakeword detection module 918 may include an expression detector that analyzes an audio signal produced by microphone(s) 908 to detect a wakeword, which generally may be a predefined word, phrase, or any other sound, or any series of temporally related sounds. Such an expression detector may be implemented using keyword spotting technology, as an example. A keyword spotter is a functional component or algorithm that evaluates an audio signal to detect the presence of a predefined word or expression within the audio signal detected by microphone(s) 908. Rather than producing a transcription of words of the speech, a keyword spotter generates a true/false output (e.g., a logical I/O) to indicate whether or not the predefined word or expression was represented in the audio signal. In some embodiments, an expression detector may be configured to analyze the audio signal to produce a score indicating a likelihood that the wakeword is represented within the audio signal detected by microphone(s) 908. The expression detector may then compare that score to a threshold to determine whether the wakeword will be declared as having been spoken.

In some embodiments, a keyword spotter may be use simplified ASR techniques. For example, an expression detector may use a Hidden Markov Model ("HMM") recognizer that performs acoustic modeling of the audio signal and compares the HMM model of the audio signal to one or more reference HMM models that have been created by training for specific trigger expressions. An HMM model represents a word as a series of states. Generally a portion of an audio signal is analyzed by comparing its HMM model to an HMM model of the trigger expression, yielding a feature score that represents the similarity of the audio signal model to the trigger expression model.

In practice, an HMM recognizer may produce multiple feature scores, corresponding to different features of the HMM models. An expression detector may use a support vector machine ("SVM") classifier that receives the one or more feature scores produced by the HMM recognizer. The SVM classifier produces a confidence score indicating the likelihood that an audio signal contains the trigger expression. The confidence score is compared to a confidence threshold to make a final decision regarding whether a particular portion of the audio signal represents an utterance of the trigger expression (e.g., wakeword). Upon declaring that the audio signal represents an utterance of the trigger expression, voice-enabled comunications device 102 may then begin sending the audio signal to backend server 908 for detecting and responds to subsequent utterances made by a user.

Communications circuitry 906 may include any circuitry allowing or enabling voice-enabled comunications device 102 to communicate with one or more devices, servers, and/or systems. For example, communications circuitry 906 may facilitate communications between voice-enabled comunications device 102 and backend server 908. Communications circuitry 906 may use any communications protocol, such as any of the previously mentioned exemplary communications protocols. In some embodiments, voice-enabled comunications device 102 may include an antenna to facilitate wireless communications with a network using various wireless technologies (e.g., Wi-Fi, Bluetooth, radiofrequency, etc.). In yet another embodiment, voice-enabled comunications device 102 may include one or more universal serial bus ("USB") ports, one or more Ethernet or broadband ports, and/or any other type of hardwire access port so that communications circuitry 906 allows voice-enabled comunications device 102 to communicate with one or more communications networks.

Voice-enabled comunications device 102 may also include one or more microphones 908 and/or transducers. Microphone(s) 908 may be any suitable component capable of detecting audio signals. For example, microphone(s) 908 may include one or more sensors for generating electrical signals and circuitry capable of processing the generated electrical signals. In some embodiments, microphone(s) 908 may include multiple microphones capable of detecting various frequency levels. As an illustrative example, voice-enabled comunications device 102 may include multiple microphones (e.g., four, seven, ten, etc.) placed at various positions about voice-enabled comunications device 102 to monitor/capture any audio outputted in the environment where voice-enabled comunications device 102 is located. The various microphones 908 may include some microphones optimized for distant sounds, while some microphones may be optimized for sounds occurring within a close range of voice-enabled comunications device 102.

Voice-enabled comunications device 102 may further include one or more speakers 910. Speaker(s) 910 may correspond to any suitable mechanism for outputting audio signals. For example, speaker(s) 910 may include one or more speaker units, transducers, arrays of speakers, and/or arrays of transducers that may be capable of broadcasting audio signals and or audio content to a surrounding area where voice-enabled comunications device 102 may be located. In some embodiments, speaker(s) 910 may include headphones or ear buds, which may be wirelessly wired, or hard-wired, to voice-enabled comunications device 102, that may be capable of broadcasting audio.

In some embodiments, one or more microphones 908 may serve as input devices to receive audio inputs, such as speech. Voice-enabled comunications device 102, may then also include one or more speakers 910 to output audible responses. In this manner, voice-enabled comunications device 102 may function solely through speech or audio, without the use or need for any input mechanisms or displays.

In one exemplary embodiment, voice-enabled comunications device 102 includes I/O interface 912. The input portion of I/O interface 912 may correspond to any suitable mechanism for receiving inputs from a user of voice-enabled comunications device 102. For example, a camera, keyboard, mouse, joystick, or external controller may be used as an input mechanism for I/O interface 912. The output portion of I/O interface 912 may correspond to any suitable mechanism for generating outputs from voice-enabled comunications device 102. For example, one or more displays may be used as an output mechanism for I/O interface 912. As another example, one or more lights, light emitting diodes ("LEDs"), or other visual indicator(s) may be used to output signals via I/O interface 912 of voice-enabled comunications device 102. In some embodiments, one or more vibrating mechanisms or other haptic features may be included with I/O interface 912 to provide a haptic response to user 102 from voice-enabled comunications device 102. Persons of ordinary skill in the art will recognize that, in some embodiments, one or more features of I/O interface 912 may be included in a purely voice-enabled version of voice communications device 102. For example, one or more LED lights may be included on voice-enabled comunications device 102 such that, when microphone(s) 908 receive audio from user 102, the one or more LED lights become illuminated signifying that audio has been received by voice-enabled comunications device 102. In some embodiments, I/O interface 912 may include a display screen and/or touch screen, which may be any size and/or shape and may be located at any portion of voice-enabled comunications device 102. Various types of displays may include, but are not limited to, liquid crystal displays ("LCD"), monochrome displays, color graphics adapter ("CGA") displays, enhanced graphics adapter ("EGA") displays, variable graphics array ("VGA") display, or any other type of display, or any combination thereof. Still further, a touch screen may, in some embodiments, correspond to a display screen including capacitive sensing panels capable of recognizing touch inputs thereon.

FIG. 9 also includes backend server 966, as mentioned previously, which may be in communication with voice-enabled comunications device 102. Backend server 966 includes various components and modules including, but not limited to, automatic speech recognition ("ASR") module 958 (which may include, for example, speech-to-text ("STT") functionality), natural language understanding ("NLU") module 960, applications module 962, and text-to-speech ("TTS") module 964. In some embodiments, backend server 966 may also include computer readable media, including, but not limited to, flash memory, random access memory ("RAM"), and/or read-only memory ("ROM"). Backend server 966 may also include various modules that store software, hardware, logic, instructions, and/or commands, such as, a speaker identification ("ID") module, a user profile module, or any other module, or any combination thereof. The speech-to-text functionality and text-to-speech functionality may be combined into a single module capable of performing both STT and TTS processing, or separate TTS and STT modules may, alternatively, be used.

ASR module 958 may be configured such that it recognizes human speech in detected audio, such as audio captured by voice-enabled comunications device 102, which is then sent to backend server 966. ASR module 958 may include, in one embodiment, one or more processor(s) 952, storage/memory 954, and communications circuitry 956. Processor(s) 952, storage/memory 954, and communications circuitry 956 may, in some embodiments, be substantially similar to processor(s) 902, storage/memory 904, and communications circuitry 906, which are described in greater detail above, and the aforementioned descriptions of the latter may apply. NLU module 960 may be configured such that it determines user intent based on the detected audio received from voice-enabled comunications device 102. NLU module 960 may include processor(s) 952, storage/memory 954, and communications circuitry 956.

Applications module 962 may, for example, correspond to various action specific applications or servers capable of processing various task specific actions. Applications module 962 may further correspond to first party applications and/or third party applications operable to perform different tasks or actions. For example, based on the context of audio received from voice-enabled comunications device 102, backend server 966 may use a certain application to perform an action, such refining an active play queue of media content. Applications module 962 may include processor(s) 952, storage/memory 954, and communications circuitry 956. As an illustrative example, applications module 962 may correspond to a media service. The electronic media service application of the applications module 962 can be associated with a customer account. The customer account can include at least one profile stored in, for example, user information that can be linked to the electronic media service application in applications module 962. Audio input data can be received at automatic speech recognition module 958 from voice communications device 102. The automatic speech recognition module 958 can use automatic speech recognition (ASR) techniques on the audio input data to generate text data of the audio input data. The natural language understanding module 960 can use natural language understanding (NLU) techniques on the text data to determine refinement/attribute information to manage the active play queue. The electronic media service application of the applications module 962 can receive information that can be used to refine or otherwise control the playback of media content, where refining the playback of media content can include filtering media content from an active play queue of media content, adding media content to the active play queue of media content, re-ordering the sequence of content in the play-queue, supplementing the active play queue, and/or changing the frequency of playback of content in the play-queue. In accordance with an embodiment, the application can determine whether there is an active play queue of media content configured to play on the voice communications device, such as a playlist of music, a station of music, a mix of songs, etc. In the situation where there is no media content being played by the voice communications device or no active play queue of media content, the electronic media service application determines media content using information in the request. The information can be used to search a catalog of media content to identify media content in response to the spoken question or request. For example, the information can be used to identify media content associated with a mood, a tempo, a genre, an artist, a year, a decade, an activity as well as any other topic or interest. The identified media can thereafter be played using the voice communications device. In the situation where there is an active play queue of media content, the information can be used to refine the play queue. For example, the information can include instructions such as refinement instructions that can be used to filter the play queue and/or add media content to the play queue from a catalog of media content. In various embodiments, the user can further refine the playback of media content. For example, in the situation where the user is engaging in a multi-turn dialog interaction with the voice communications device, where the user sends multiple requests to the voice communications device to refine the media playing, the user can first instruct the device to play "happy" music. If the user desires "happier" music, the user can instruct the voice communications device to play "happier" music.

TTS module 964 may employ various text-to-speech techniques. It should be noted that techniques for taking text and converting it into audio input data that can represent speech are well known in the art and need not be described in further detail herein, any suitable computer implemented techniques may be used. TTS module 964 may also include processor(s) 952, storage/memory 954, and communications circuitry 956.

Persons of ordinary skill in the art will recognize that although each of ASR module 958, NLU module 960, applications module 962, and TTS module 964 include instances of processor(s) 952, storage/memory 954, and communications circuitry 956, those instances of processor(s) 952, storage/memory 954, and communications circuitry 956 within each of ASR module 958, NLU module 960, applications module 962, and STT/TTS module 964 may differ. For example, the structure, function, and style of processor(s) 952 within ASR module 958 may be substantially similar to the structure, function, and style of processor(s) 952 within NLU module 960, however the actual processor(s) 952 need not be the same entity.

Figure 10:
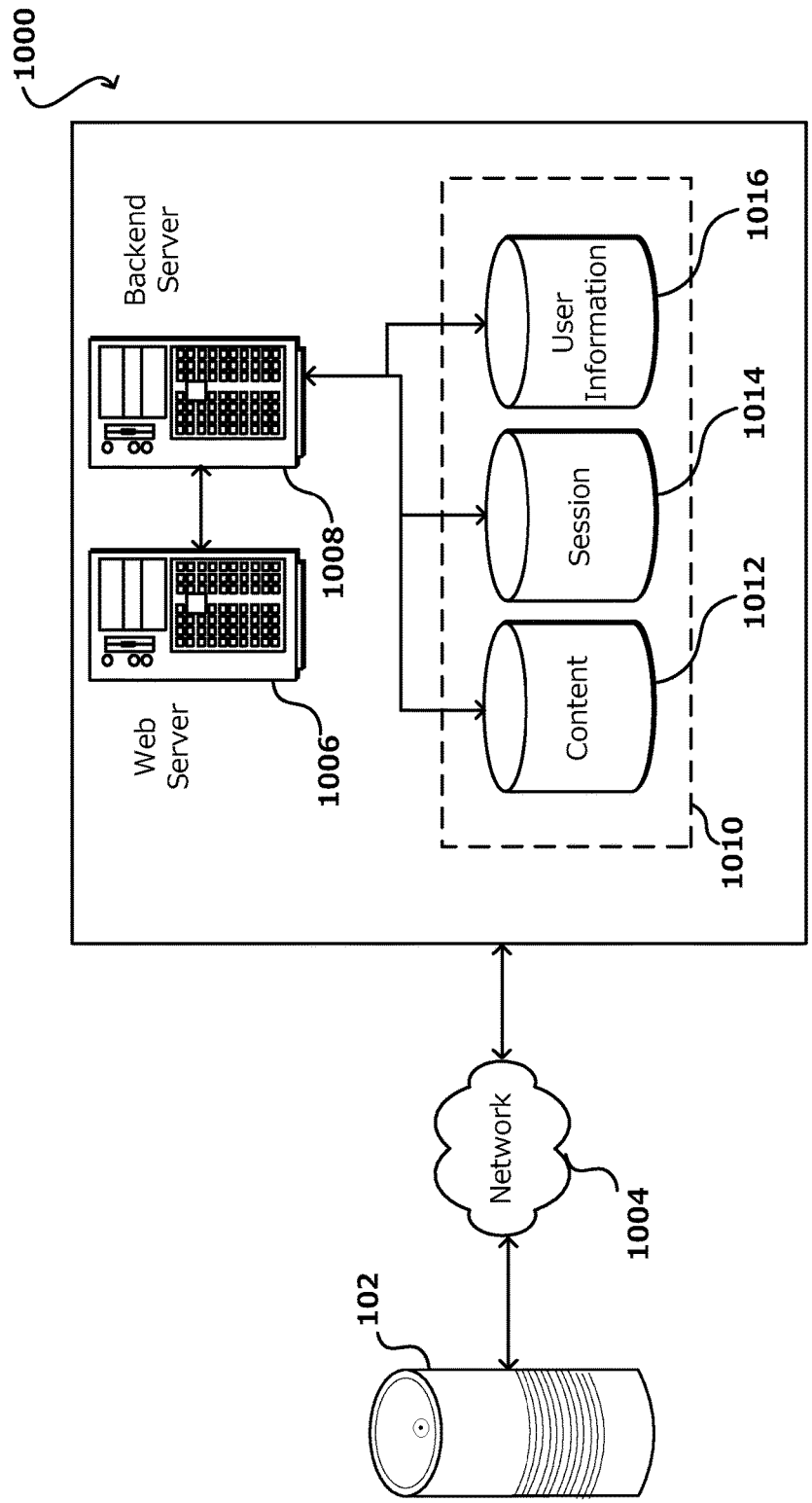
FIG. 10 illustrates an example environment in which various embodiments can be implemented.

In accordance with various embodiments, different approaches can be implemented in various environments in accordance with the described embodiments. For example, FIG. 10 illustrates an example of an environment 1000 for implementing aspects in accordance with various embodiments. As will be appreciated, although a Web-based environment is used for purposes of explanation, different environments may be used, as appropriate, to implement various embodiments. The system includes voice communications device 102, which can include any appropriate device operable to send and receive requests, messages or information over network 1004 and convey information back to an appropriate device. The network can include any appropriate network, including a telephone network provided by a telecommunication operator, an intranet, the Internet, a cellular network, a local area network, wireless network, or any other such network or combination thereof. Communication over the network can be enabled via wired or wireless connections and combinations thereof. In this example, the network includes the Internet, as the environment includes a Web server 1006 for receiving requests and serving content in response thereto, although for other networks, an alternative device serving a similar purpose could be used, as would be apparent to one of ordinary skill in the art.

The illustrative environment includes at least one backend server 1008 and a data store 1010. It should be understood that there can be several backend servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The backend server 1008 can include any appropriate hardware and software for integrating with the data store 1010 as needed to execute aspects of one or more applications for the client device and handling a majority of the data access and business logic for an application. The application server provides access control services in cooperation with the data store and is able to analyze audio date and other data as well as generate content such as text, graphics, audio and/or video to be transferred to the user, which may be served to the user by the Web server 1006 in the form of HTML, XML or another appropriate structured language in this example. The handling of all requests and responses, as well as the delivery of content between the voice communications device 102 and the backend server 1008, can be handled by the Web server 1006. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing content (e.g., production data) 1012 and user information 1016, which can be used to serve content for the production side. The data store is also shown to include a mechanism for storing log or session data 1014. It should be understood that there can be other information that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the backend server 1008 and obtain, update or otherwise process data in response thereto. In one such example, the voice communications device can receive a request to refine the playback of media content, such as music, news, audio books, audio broadcasts, and other such content. In this case, the data store might access the user information to verify the identity of the user and access a media service to determine media content the user is associated with. The user's speech can be analyzed and used to generate an updated active play queue or initiate the playback of media content.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java, C, C# or C++ or any scripting language, such as Perl, Python or TCL, as well as combinations thereof. The server(s) may also include database servers, including without limitation those commercially available from Oracle, Microsoft, Sybase and IBM.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display screen or keypad, microphone, camera, etc.) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, sending and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A communication management system, comprising:
   at least one device processor;
   a memory device including instructions that, when executed by the at least one device processor, enable the communication management system to:
   receive audio input data from a voice communications device, the audio input data corresponding to an utterance received by a microphone of the voice communications device;

generate text data from the audio input data by performing automated speech recognition (ASR) on the audio input data;
analyze the text data using natural language processing (NLP) to determine a call connection intent and a target recipient represented by the audio input data, the call connection request specifying a target recipient;
determine, by a record manager, a target address of record (AOR) associated with the target recipient, the target AOR being a virtual AOR (VAOR) associated with a first AOR and with a second AOR of the communication management system, a first communications device being registered to the first AOR corresponding to a target recipient, a second communications device being registered to the second AOR corresponding to the target recipient and an additional user;
send the target AOR to the voice communications device;
receive, to a connection management service, a subsequent connection request from the voice communications device, the subsequent connection request specifying the target AOR;
send the call connection request to a first session initiation protocol (SIP) endpoint, for the first communications device, and to a second SIP endpoint, for the second communications device, associated with the target AOR;
receive an acknowledgement from an acknowledging device of the first communications device or the second communications device; and
establish a call connection between the voice communications device and the acknowledging device.

2. The communication management system of claim 1, wherein the first AOR is a personal AOR to which communications devices associated with the target recipient are registered, and wherein the second AOR is a communal AOR to which communications devices associated with both the target recipient and the additional user are registered.

3. The communication management system of claim 1, wherein the instructions, when executed further enable the communication management system to:
receive second audio input data from the voice communications device;
determine a second call connection request represented in the second audio input data, the call connection request specifying a household recipient;
determine a household address of record (AOR) associated with the target recipient, the household AOR being a virtual AOR (VAOR) associated with the first AOR and to the second AOR, the household AOR being further associated with a third AOR registered to the additional user and having a third communications device registered thereto;
send the household AOR to the voice communications device; and
send a subsequent call connection request to the first system endpoint for the first communications device, the second system endpoint for the second communications device, and the third system endpoint for the third communications device as associated with the household AOR.

4. The communication management system of claim 1, wherein the instructions, when executed further enable the communication management system to:
receive a registration request for a specified communications device;
determine one or more users associated with the specified communications device;
determine a specific AOR associated with the one or more users;
register the specified communications device with the specific AOR; and
associate the specific AOR with one or more related VAORs associated with at least one of the one or more users.

5. The communication management system of claim 1, wherein the instructions, when executed further enable the communication management system to:
allow an identified communications device to register with at most a single AOR of a plurality of AORs of the communication management system, the single AOR capable of being associated with one or more of an AOR or a VAOR.

6. A computer-implemented method, comprising:
receiving a call connection request specifying a target recipient;
determining a target address of record (AOR) associated with the target recipient, the target AOR being a virtual AOR (VAOR) associated with at least a first AOR and a second AOR, a first communications device being registered to the first AOR corresponding to a target recipient, a second communications device being registered to the second AOR corresponding to the target recipient and an additional user;
sending the call connection request to a first system endpoint for the first communications device; and
sending the call connection request to a second system endpoint for the second communications device.

7. The computer-implemented method of claim 6, further comprising:
registering the first communications device with to the first AOR using the session initiation protocol (SIP).

8. The computer-implemented method of claim 6, further comprising:
receiving an acknowledgement from the first communications device; and
establishing a call connection between a user communications device, from which the call connection request was received, and the first communications device.

9. The computer-implemented method of claim 6, further comprising:
receiving a registration request for a specified communications device;
determining one or more users associated with the specified communications device;
determining a specific AOR associated with the one or more users; and
registering the specified communications device with the specific AOR.

10. The computer-implemented method of claim 6, further comprising:
determining one or more groupings of users including at least one of the one or more users;
determining one or more identified VAORs for the one or more groupings; and
associating the specific AOR with the one or more identified VAORs.

11. The computer-implemented method of claim 6, further comprising:
determining that the target recipient corresponds to a group of users; and determining the target address of record (VAOR) corresponding to the group of users.

12. The computer-implemented method of claim 6, further comprising:
determining the target address of record (AOR) is further associated with a third AOR to which a communications application is registered; and
sending the call connection request to a third system endpoint for the communications application, the communications application capable of executing on a plurality of different electronic devices.

13. The computer-implemented method of claim 6, further comprising:
receiving a second call connection request specifying the first AOR; and
sending the second call connection request to the first system endpoint for the first communications device.

14. The computer-implemented method of claim 6, further comprising:
receiving audio input data from a user communications device configured for voice communications, the audio input data corresponding to an utterance received by at least one microphone of the user communications device;
generating text data from the audio input data by performing automated speech recognition (ASR) on the audio input data; and
determining the call connection request by performing natural language processing (NLP) on the text data, the call connection request specifying a target recipient.

15. The computer-implemented method of claim 6, further comprising:
establishing a call connection for the call connection request using a session initiation protocol (SIP) proxy, the SIP proxy configured to enforce one or more policies for the call connection.

16. A system, comprising:
at least one device processor;
a memory device including instructions that, when executed by the at least one device processor, enable the system to:
receive a call connection request specifying a target recipient;
determine a target address of record (AOR) associated with the target recipient, the target AOR being a virtual AOR (VAOR) associated with at least a first AOR and a second AOR, a first communications device being registered to the first AOR corresponding to a target recipient, a second communications device being registered to the second AOR corresponding to the target recipient and an additional user;
send the call connection request to a first system endpoint for the first communications device; and
send the call connection request to a second system endpoint for the second communications device.

17. The system of claim 16, wherein the instructions, when executed further enable the communication management system to:
receive an acknowledgement from the first communications device; and
establish a call connection between a user communications device, from which the call connection request was received, and the first communications device.

18. The system of claim 16, wherein the instructions, when executed further enable the communication management system to:
receive a registration request for a specified communications device;
determine one or more users associated with the specified communications device;
determine a specific AOR associated with the one or more users; and
register the specified communications device with the specific AOR of the communication management system.

19. The system of claim 16, wherein the instructions, when executed further enable the communication management system to:
determine one or more groupings of users including at least one of the one or more users;
determine one or more identified VAORs for the one or more groupings; and
associate the specific AOR with the one or more identified VAORs.

20. The system of claim 16, wherein the instructions, when executed further enable the communication management system to:
receive audio input data from a user communications device configured for voice communications, the audio input data corresponding to an utterance received by at least one microphone of the user communications device;
generate text data from the audio input data by performing automated speech recognition (ASR) on the audio input data; and
determine the call connection request by performing natural language processing (NLP) on the text data, the call connection request specifying a target recipient.

* * * * *